US010616839B2

United States Patent
Fan et al.

(10) Patent No.: US 10,616,839 B2
(45) Date of Patent: Apr. 7, 2020

(54) OVER-THE-AIR PHASE SYNCHRONIZATIN FOR RECIPROCITY-BASED COMP JOINT TRANSMISSION

(71) Applicant: QUALCOMM Incorporated, San Diego, CA (US)

(72) Inventors: Zhifei Fan, San Diego, CA (US); Taesang Yoo, San Diego, CA (US); Xiaoxia Zhang, San Diego, CA (US); Seyed Ali Akbar Fakoorian, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 15 days.

(21) Appl. No.: 15/830,760

(22) Filed: Dec. 4, 2017

(65) Prior Publication Data

US 2018/0317186 A1 Nov. 1, 2018

Related U.S. Application Data

(60) Provisional application No. 62/491,046, filed on Apr. 27, 2017.

(51) Int. Cl.
*H04W 56/00* (2009.01)
*H04L 5/00* (2006.01)
(Continued)

(52) U.S. Cl.
CPC ........ *H04W 56/0005* (2013.01); *H04B 7/024* (2013.01); *H04B 7/0617* (2013.01);
(Continued)

(58) Field of Classification Search
CPC ..... H04B 7/024; H04B 7/0617; H04J 11/0053
See application file for complete search history.

(56) References Cited

U.S. PATENT DOCUMENTS

2010/0315970 A1* 12/2010 Ramamurthi ........ H04B 7/0619
370/252
2012/0093143 A1* 4/2012 Sun ........................ H04B 7/024
370/338
(Continued)

FOREIGN PATENT DOCUMENTS

WO WO-2014023727 A1 2/2014
WO WO-2015182742 A1 12/2015

OTHER PUBLICATIONS

Partial International Search Report—PCT/US2018/026922—ISA/ EPO—dated Jul. 4, 2018 (173788WO).
(Continued)

*Primary Examiner* — Asad M Nawaz
*Assistant Examiner* — Syed Ali
(74) *Attorney, Agent, or Firm* — Norton Rose Fulbright US LLP

(57) ABSTRACT

Over-the-air phase synchronization for reciprocity-based coordinated multipoint (CoMP) joint transmission is discussed. The base stations of the CoMP group and served user equipment (UEs) each transmit phase synchronization reference signals (PSRS). The receiving nodes will compute co-phasing values representing the phase difference between pairs of the PSRS. For example, the difference between two downlink PSRS computed at the UE for a downlink co-phasing value, and the difference between a single PSRS received at two base stations computed at the base station for an uplink co-phasing value. The base stations of the CoMP group may determine a phase compensation by computing the differences between the uplink and downlink co-phasing values and use that phase compensation to adjust communications by the base stations in the CoMP group. In other aspects, the computed co-phasing values may be used to modulate each nodes transmission of its respective PSRS.

21 Claims, 10 Drawing Sheets

(51) Int. Cl.
  *H04L 27/26* (2006.01)
  *H04J 11/00* (2006.01)
  *H04B 7/024* (2017.01)
  *H04B 7/06* (2006.01)

(52) U.S. Cl.
  CPC ........ *H04J 11/0053* (2013.01); *H04L 5/0035* (2013.01); *H04L 5/0048* (2013.01); *H04L 27/2657* (2013.01); *H04W 56/001* (2013.01); *H04W 56/0035* (2013.01); *H04B 7/0626* (2013.01); *H04L 27/2675* (2013.01)

(56) References Cited

U.S. PATENT DOCUMENTS

| | | | |
|---|---|---|---|
| 2013/0029586 A1 | 1/2013 | Wang | |
| 2013/0156125 A1* | 6/2013 | Ko | H04B 7/0478 375/267 |
| 2013/0303230 A1* | 11/2013 | Sayana | H04W 24/08 455/524 |
| 2014/0241454 A1 | 8/2014 | Kim et al. | |
| 2017/0134082 A1* | 5/2017 | Onggosanusi | H04B 7/0478 |
| 2017/0195028 A1 | 7/2017 | Shimezawa et al. | |
| 2017/0311296 A1* | 10/2017 | Onggosanusi | H04B 7/0456 |
| 2018/0167115 A1* | 6/2018 | Zhu | H04B 7/0478 |
| 2018/0167903 A1* | 6/2018 | Fan | H04W 56/0015 |
| 2018/0248642 A1 | 8/2018 | Si et al. | |

OTHER PUBLICATIONS

International Search Report and Written Opinion—PCT/US2018/026922—ISA/EPO—dated Sep. 10, 2018 (173788WO).

* cited by examiner

OVER-THE-AIR PHASE SYNCHRONIZATIN FOR RECIPROCITY-BASED COMP JOINT TRANSMISSION

CROSS-REFERENCE TO RELATED APPLICATIONS

This application claims the benefit of U.S. Provisional Patent Application No. 62/491,046, entitled, "OVER-THE-AIR PHASE SYNCHRONIZATION FOR RECIPROCITY-BASED COMP JOINT TRANSMISSION," filed on Apr. 27, 2017, which is expressly incorporated by reference herein in its entirety.

BACKGROUND

Field

Aspects of the present disclosure relate generally to wireless communication systems, and more particularly, to over-the-air phase synchronization for reciprocity-based coordinated multipoint (CoMP) joint transmission.

Background

Wireless communication networks are widely deployed to provide various communication services such as voice, video, packet data, messaging, broadcast, and the like. These wireless networks may be multiple-access networks capable of supporting multiple users by sharing the available network resources. Such networks, which are usually multiple access networks, support communications for multiple users by sharing the available network resources. One example of such a network is the Universal Terrestrial Radio Access Network (UTRAN). The UTRAN is the radio access network (RAN) defined as a part of the Universal Mobile Telecommunications System (UMTS), a third generation (3G) mobile phone technology supported by the 3rd Generation Partnership Project (3GPP). Examples of multiple-access network formats include Code Division Multiple Access (CDMA) networks, Time Division Multiple Access (TDMA) networks, Frequency Division Multiple Access (FDMA) networks, Orthogonal FDMA (OFDMA) networks, and Single-Carrier FDMA (SC-FDMA) networks.

A wireless communication network may include a number of base stations or node Bs that can support communication for a number of user equipments (UEs). A UE may communicate with a base station via downlink and uplink. The downlink (or forward link) refers to the communication link from the base station to the UE, and the uplink (or reverse link) refers to the communication link from the UE to the base station.

A base station may transmit data and control information on the downlink to a UE and/or may receive data and control information on the uplink from the UE. On the downlink, a transmission from the base station may encounter interference due to transmissions from neighbor base stations or from other wireless radio frequency (RF) transmitters. On the uplink, a transmission from the UE may encounter interference from uplink transmissions of other UEs communicating with the neighbor base stations or from other wireless RF transmitters. This interference may degrade performance on both the downlink and uplink.

As the demand for mobile broadband access continues to increase, the possibilities of interference and congested networks grows with more UEs accessing the long-range wireless communication networks and more short-range wireless systems being deployed in communities. Research and development continue to advance wireless technologies not only to meet the growing demand for mobile broadband access, but to advance and enhance the user experience with mobile communications.

SUMMARY

In one aspect of the disclosure, a method of wireless communication includes receiving, at a base station, a downlink co-phasing value from one or more served UEs, wherein the downlink co-phasing value represents a first phase difference between downlink phase synchronization reference signals (PSRS) received at each of the one or more served UEs from a pair of base station, and wherein the base station is one of a plurality of base stations in a coordinated multipoint (CoMP) group serving the one or more served UEs, receiving, at the base station, an uplink PSRS from the one or more served UEs, computing, by the base station, an uplink co-phasing value based on a second phase difference between the uplink PSRS as received by a pair of base stations of the plurality of base stations, and applying, by the base station, a phase correction value to communications by the plurality of base stations in the CoMP group, wherein the phase correction value corresponds to a difference between the downlink co-phasing value and the uplink co-phasing value.

In an additional aspect of the disclosure, a method of wireless communication includes transmitting, by a UE, an uplink PSRS to one or more base stations, wherein the one or more base stations are part of a plurality of base stations in a CoMP group serving the UE, receiving, at the UE, a downlink PSRS from each of the plurality of base stations in the CoMP group, determining, by the UE, a downlink co-phasing value between each pair of the plurality of base stations representing a phase difference between the downlink PSRS from each of the pair, and reporting, by the UE, the downlink co-phasing value for the each pair.

In an additional aspect of the disclosure, a method of wireless communications includes receiving, at a first network node, a first PSRS from a plurality of other network nodes in communication with the first network node, computing, by the first network node, a co-phasing value based on a phase difference between the first PSRS of each pair of the plurality of other network nodes, and transmitting, by the first network node, a second PSRS to one or more of the plurality of other network nodes, wherein the second PSRS is modulated for transmission by the first network node using the co-phasing value.

In an additional aspect of the disclosure, an apparatus configured for wireless communication includes means for receiving, at a base station, a downlink co-phasing value from one or more served UEs, wherein the downlink co-phasing value represents a first phase difference between downlink PSRS received at each of the one or more served UEs from a pair of base station, and wherein the base station is one of a plurality of base stations in a CoMP group serving the one or more served UEs, means for receiving, at the base station, an uplink PSRS from the one or more served UEs, means for computing, by the base station, an uplink co-phasing value based on a second phase difference between the uplink PSRS as received by a pair of base stations of the plurality of base stations, and means for applying, by the base station, a phase correction value to communications by the plurality of base stations in the CoMP group, wherein the phase correction value corresponds to a difference between the downlink co-phasing value and the uplink co-phasing value.

In an additional aspect of the disclosure, an apparatus configured for wireless communication includes means for transmitting, by a UE, an uplink PSRS to one or more base stations, wherein the one or more base stations are part of a plurality of base stations in a CoMP group serving the UE, means for receiving, at the UE, a downlink PSRS from each of the plurality of base stations in the CoMP group, means for determining, by the UE, a downlink co-phasing value between each pair of the plurality of base stations representing a phase difference between the downlink PSRS from each of the pair, and means for reporting, by the UE, the downlink co-phasing value for the each pair.

In an additional aspect of the disclosure, an apparatus configured for wireless communication includes means for receiving, at a first network node, a first PSRS from a plurality of other network nodes in communication with the first network node, means for computing, by the first network node, a co-phasing value based on a phase difference between the first PSRS of each pair of the plurality of other network nodes, and means for transmitting, by the first network node, a second PSRS to one or more of the plurality of other network nodes, wherein the second PSRS is modulated for transmission by the first network node using the co-phasing value.

In an additional aspect of the disclosure, a non-transitory computer-readable medium having program code recorded thereon. The program code further includes code to receive, at a base station, a downlink co-phasing value from one or more served UEs, wherein the downlink co-phasing value represents a first phase difference between downlink PSRS received at each of the one or more served UEs from a pair of base station, and wherein the base station is one of a plurality of base stations in a CoMP group serving the one or more served UEs, code to receive, at the base station, an uplink PSRS from the one or more served UEs, code to compute, by the base station, an uplink co-phasing value based on a second phase difference between the uplink PSRS as received by a pair of base stations of the plurality of base stations, and code to apply, by the base station, a phase correction value to communications by the plurality of base stations in the CoMP group, wherein the phase correction value corresponds to a difference between the downlink co-phasing value and the uplink co-phasing value.

In an additional aspect of the disclosure, a non-transitory computer-readable medium having program code recorded thereon. The program code further includes code to transmit, by a UE, an uplink PSRS to one or more base stations, wherein the one or more base stations are part of a plurality of base stations in a CoMP group serving the UE, code to receive, at the UE, a downlink PSRS from each of the plurality of base stations in the CoMP group, code to determine, by the UE, a downlink co-phasing value between each pair of the plurality of base stations representing a phase difference between the downlink PSRS from each of the pair, and code to report, by the UE, the downlink co-phasing value for the each pair.

In an additional aspect of the disclosure, a non-transitory computer-readable medium having program code recorded thereon. The program code further includes code to receive, at a first network node, a first PSRS from a plurality of other network nodes in communication with the first network node, code to compute, by the first network node, a co-phasing value based on a phase difference between the first PSRS of each pair of the plurality of other network nodes, and code to transmit, by the first network node, a second PSRS to one or more of the plurality of other network nodes, wherein the second PSRS is modulated for transmission by the first network node using the co-phasing value.

In an additional aspect of the disclosure, an apparatus configured for wireless communication is disclosed. The apparatus includes at least one processor, and a memory coupled to the processor. The processor is configured to receive, at a base station, a downlink co-phasing value from one or more served UEs, wherein the downlink co-phasing value represents a first phase difference between downlink PSRS received at each of the one or more served UEs from a pair of base station, and wherein the base station is one of a plurality of base stations in a CoMP group serving the one or more served UEs, to receive, at the base station, an uplink PSRS from the one or more served UEs, to compute, by the base station, an uplink co-phasing value based on a second phase difference between the uplink PSRS as received by a pair of base stations of the plurality of base stations, and to apply, by the base station, a phase correction value to communications by the plurality of base stations in the CoMP group, wherein the phase correction value corresponds to a difference between the downlink co-phasing value and the uplink co-phasing value.

In an additional aspect of the disclosure, an apparatus configured for wireless communication is disclosed. The apparatus includes at least one processor, and a memory coupled to the processor. The processor is configured to transmit, by a UE, an uplink PSRS to one or more base stations, wherein the one or more base stations are part of a plurality of base stations in a CoMP group serving the UE, to receive, at the UE, a downlink PSRS from each of the plurality of base stations in the CoMP group, to determine, by the UE, a downlink co-phasing value between each pair of the plurality of base stations representing a phase difference between the downlink PSRS from each of the pair, and to report, by the UE, the downlink co-phasing value for the each pair.

In an additional aspect of the disclosure, an apparatus configured for wireless communication is disclosed. The apparatus includes at least one processor, and a memory coupled to the processor. The processor is configured to receive, at a first network node, a first PSRS from a plurality of other network nodes in communication with the first network node, to compute, by the first network node, a co-phasing value based on a phase difference between the first PSRS of each pair of the plurality of other network nodes, and to transmit, by the first network node, a second PSRS to one or more of the plurality of other network nodes, wherein the second PSRS is modulated for transmission by the first network node using the co-phasing value.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purpose of illustration and description, and not as a definition of the limits of the claims.

BRIEF DESCRIPTION OF THE DRAWINGS

A further understanding of the nature and advantages of the present disclosure may be realized by reference to the following drawings. In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label.

DETAILED DESCRIPTION

Figure 1:
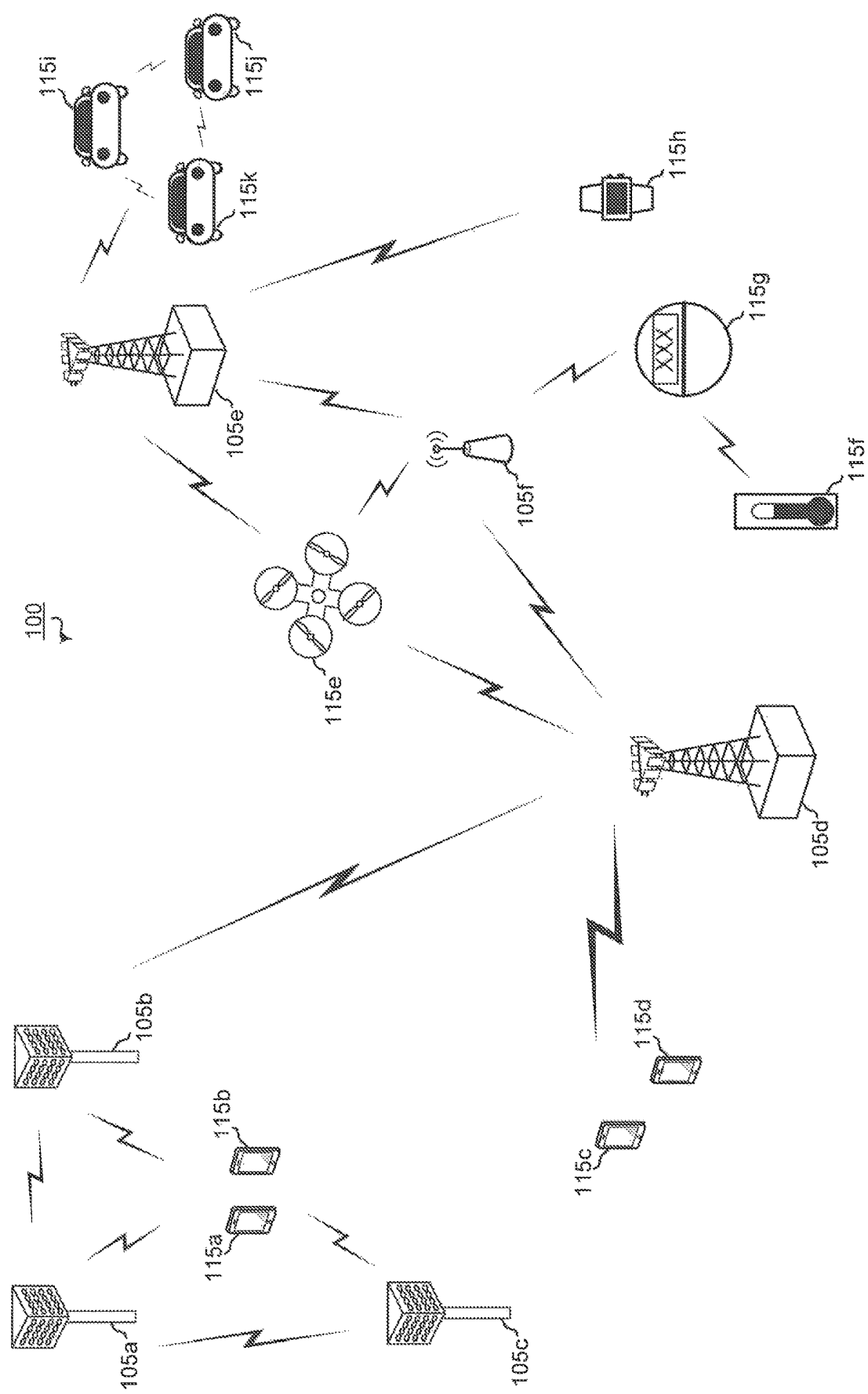
FIG. 1 is a block diagram illustrating details of a wireless communication system.

The detailed description set forth below, in connection with the appended drawings, is intended as a description of various configurations and is not intended to limit the scope of the disclosure. Rather, the detailed description includes specific details for the purpose of providing a thorough understanding of the inventive subject matter. It will be apparent to those skilled in the art that these specific details are not required in every case and that, in some instances, well-known structures and components are shown in block diagram form for clarity of presentation.

This disclosure relates generally to providing or participating in authorized shared access between two or more wireless communications systems, also referred to as wireless communications networks. In various embodiments, the techniques and apparatus may be used for wireless communication networks such as code division multiple access (CDMA) networks, time division multiple access (TDMA) networks, frequency division multiple access (FDMA) networks, orthogonal FDMA (OFDMA) networks, single-carrier FDMA (SC-FDMA) networks, LTE networks, GSM networks, $5^{th}$ Generation (5G) or new radio (NR) networks, as well as other communications networks. As described herein, the terms "networks" and "systems" may be used interchangeably.

An OFDMA network may implement a radio technology such as evolved UTRA (E-UTRA), IEEE 802.11, IEEE 802.16, IEEE 802.20, flash-OFDM and the like. UTRA, E-UTRA, and Global System for Mobile Communications (GSM) are part of universal mobile telecommunication system (UMTS). In particular, long term evolution (LTE) is a release of UMTS that uses E-UTRA. UTRA, E-UTRA, GSM, UMTS and LTE are described in documents provided from an organization named "3rd Generation Partnership Project" (3GPP), and cdma2000 is described in documents from an organization named "3rd Generation Partnership Project 2" (3GPP2). These various radio technologies and standards are known or are being developed. For example, the 3rd Generation Partnership Project (3GPP) is a collaboration between groups of telecommunications associations that aims to define a globally applicable third generation (3G) mobile phone specification. 3GPP long term evolution (LTE) is a 3GPP project which was aimed at improving the universal mobile telecommunications system (UMTS) mobile phone standard. The 3GPP may define specifications for the next generation of mobile networks, mobile systems, and mobile devices. The present disclosure is concerned with the evolution of wireless technologies from LTE, 4G, 5G, NR, and beyond with shared access to wireless spectrum between networks using a collection of new and different radio access technologies or radio air interfaces.

In particular, 5G networks contemplate diverse deployments, diverse spectrum, and diverse services and devices that may be implemented using an OFDM-based unified, air interface. In order to achieve these goals, further enhancements to LTE and LTE-A are considered in addition to development of the new radio technology for 5G NR networks. The 5G NR will be capable of scaling to provide coverage (1) to a massive Internet of things (IoTs) with an ultra-high density (e.g., ~1M nodes/km$^2$), ultra-low complexity (e.g., ~10 s of bits/sec), ultra-low energy (e.g., ~10+ years of battery life), and deep coverage with the capability to reach challenging locations; (2) including mission-critical control with strong security to safeguard sensitive personal, financial, or classified information, ultra-high reliability (e.g., ~99.9999% reliability), ultra-low latency (e.g., ~1 ms), and users with wide ranges of mobility or lack thereof; and (3) with enhanced mobile broadband including extreme high capacity (e.g., ~10 Tbps/km$^2$), extreme data rates (e.g., multi-Gbps rate, 100+ Mbps user experienced rates), and deep awareness with advanced discovery and optimizations.

The 5G NR may be implemented to use optimized OFDM-based waveforms with scalable numerology and transmission time interval (TTI); having a common, flexible framework to efficiently multiplex services and features with a dynamic, low-latency time division duplex (TDD)/frequency division duplex (FDD) design; and with advanced wireless technologies, such as massive multiple input, multiple output (MIMO), robust millimeter wave (mmWave) transmissions, advanced channel coding, and device-centric mobility. Scalability of the numerology in 5G NR, with scaling of subcarrier spacing, may efficiently address operating diverse services across diverse spectrum and diverse deployments. For example, in various outdoor and macro coverage deployments of less than 3 GHz FDD/TDD implementations, subcarrier spacing may occur with 15 kHz, for example over 1, 5, 10, 20 MHz, and the like bandwidth. For other various outdoor and small cell coverage deployments of TDD greater than 3 GHz, subcarrier spacing may occur with 30 kHz over 80/100 MHz bandwidth. For other various indoor wideband implementations, using a TDD over the unlicensed portion of the 5 GHz band, the subcarrier spacing may occur with 60 kHz over a 160 MHz bandwidth. Finally, for various deployments transmitting with mmWave components at a TDD of 28 GHz, subcarrier spacing may occur with 120 kHz over a 500 MHz bandwidth.

The scalable numerology of the 5G NR facilitates scalable TTI for diverse latency and quality of service (QoS) requirements. For example, shorter TTI may be used for low latency and high reliability, while longer TTI may be used for higher spectral efficiency. The efficient multiplexing of long and short TTIs to allow transmissions to start on symbol boundaries. 5G NR also contemplates a self-contained integrated subframe design with uplink/downlink scheduling information, data, and acknowledgement in the same subframe. The self-contained integrated subframe supports communications in unlicensed or contention-based shared spectrum, adaptive uplink/downlink that may be flexibly configured on a per-cell basis to dynamically switch between uplink and downlink to meet the current traffic needs.

Various other aspects and features of the disclosure are further described below. It should be apparent that the teachings herein may be embodied in a wide variety of forms and that any specific structure, function, or both being disclosed herein is merely representative and not limiting. Based on the teachings herein one of an ordinary level of skill in the art should appreciate that an aspect disclosed herein may be implemented independently of any other aspects and that two or more of these aspects may be combined in various ways. For example, an apparatus may be implemented or a method may be practiced using any number of the aspects set forth herein. In addition, such an apparatus may be implemented or such a method may be practiced using other structure, functionality, or structure and functionality in addition to or other than one or more of the aspects set forth herein. For example, a method may be implemented as part of a system, device, apparatus, and/or as instructions stored on a computer readable medium for execution on a processor or computer. Furthermore, an aspect may comprise at least one element of a claim.

FIG. 1 is a block diagram illustrating 5G network 100 including various base stations and UEs configured according to aspects of the present disclosure. The 5G network 100 includes a number of base stations 105 and other network entities. A base station may be a station that communicates with the UEs and may also be referred to as an evolved node B (eNB), a next generation eNB (gNB), an access point, and the like. Each base station 105 may provide communication coverage for a particular geographic area. In 3GPP, the term "cell" can refer to this particular geographic coverage area of a base station and/or a base station subsystem serving the coverage area, depending on the context in which the term is used.

A base station may provide communication coverage for a macro cell or a small cell, such as a pico cell or a femto cell, and/or other types of cell. A macro cell generally covers a relatively large geographic area (e.g., several kilometers in radius) and may allow unrestricted access by UEs with service subscriptions with the network provider. A small cell, such as a pico cell, would generally cover a relatively smaller geographic area and may allow unrestricted access by UEs with service subscriptions with the network provider. A small cell, such as a femto cell, would also generally cover a relatively small geographic area (e.g., a home) and, in addition to unrestricted access, may also provide restricted access by UEs having an association with the femto cell (e.g., UEs in a closed subscriber group (CSG), UEs for users in the home, and the like). A base station for a macro cell may be referred to as a macro base station. A base station for a small cell may be referred to as a small cell base station, a pico base station, a femto base station or a home base station. In the example shown in FIG. 1, the base stations 105d and 105e are regular macro base stations, while base stations 105a-105c are macro base stations enabled with one of 3 dimension (3D), full dimension (FD), or massive MIMO. Base stations 105a-105c take advantage of their higher dimension MIMO capabilities to exploit 3D beamforming in both elevation and azimuth beamforming to increase coverage and capacity. Base station 105f is a small cell base station which may be a home node or portable access point. A base station may support one or multiple (e.g., two, three, four, and the like) cells.

The 5G network 100 may support synchronous or asynchronous operation. For synchronous operation, the base stations may have similar frame timing, and transmissions from different base stations may be approximately aligned in time. For asynchronous operation, the base stations may have different frame timing, and transmissions from different base stations may not be aligned in time.

The UEs 115 are dispersed throughout the wireless network 100, and each UE may be stationary or mobile. A UE may also be referred to as a terminal, a mobile station, a subscriber unit, a station, or the like. A UE may be a cellular phone, a personal digital assistant (PDA), a wireless modem, a wireless communication device, a handheld device, a tablet computer, a laptop computer, a cordless phone, a wireless local loop (WLL) station, or the like. In one aspect, a UE may be a device that includes a Universal Integrated Circuit Card (UICC). In another aspect, a UE may be a device that does not include a UICC. In some aspects, UEs that do not include UICCs may also be referred to as internet of everything (IoE) devices. UEs 115a-115d are examples of mobile smart phone-type devices accessing 5G network 100 A UE may also be a machine specifically configured for connected communication, including machine type communication (MTC), enhanced MTC (eMTC), narrowband IoT (NB-IoT) and the like. UEs 115e-115k are examples of various machines configured for communication that access 5G network 100. A UE may be able to communicate with any type of the base stations, whether macro base station, small cell, or the like. In FIG. 1, a lightning bolt (e.g., communication links) indicates wireless transmissions between a UE and a serving base station, which is a base station designated to serve the UE on the downlink and/or uplink, or desired transmission between base stations, and backhaul transmissions between base stations.

In operation at 5G network 100, base stations 105a-105c serve UEs 115a and 115b using 3D beamforming and coordinated spatial techniques, such as coordinated multipoint (CoMP) or multi-connectivity. Macro base station 105d performs backhaul communications with base stations 105a-105c, as well as small cell, base station 105f. Macro base station 105d also transmits multicast services which are subscribed to and received by UEs 115c and 115d. Such multicast services may include mobile television or stream video, or may include other services for providing community information, such as weather emergencies or alerts, such as Amber alerts or gray alerts.

5G network 100 also support mission critical communications with ultra-reliable and redundant links for mission critical devices, such UE 115e, which is a drone. Redundant communication links with UE 115e include from macro base stations 105d and 105e, as well as small cell base station 105f. Other machine type devices, such as UE 115f (thermometer), UE 115g (smart meter), and UE 115h (wearable device) may communicate through 5G network 100 either directly with base stations, such as small cell base station 105f, and macro base station 105e, or in multi-hop configurations by communicating with another user device which relays its information to the network, such as UE 115f communicating temperature measurement information to the smart meter, UE 115g, which is then reported to the network through small cell base station 105f. 5G network 100 may also provide additional network efficiency through dynamic, low-latency TDD/FDD communications, such as in a vehicle-to-vehicle (V2V) mesh network between UEs 115i-115k communicating with macro base station 105e.

Figure 2:
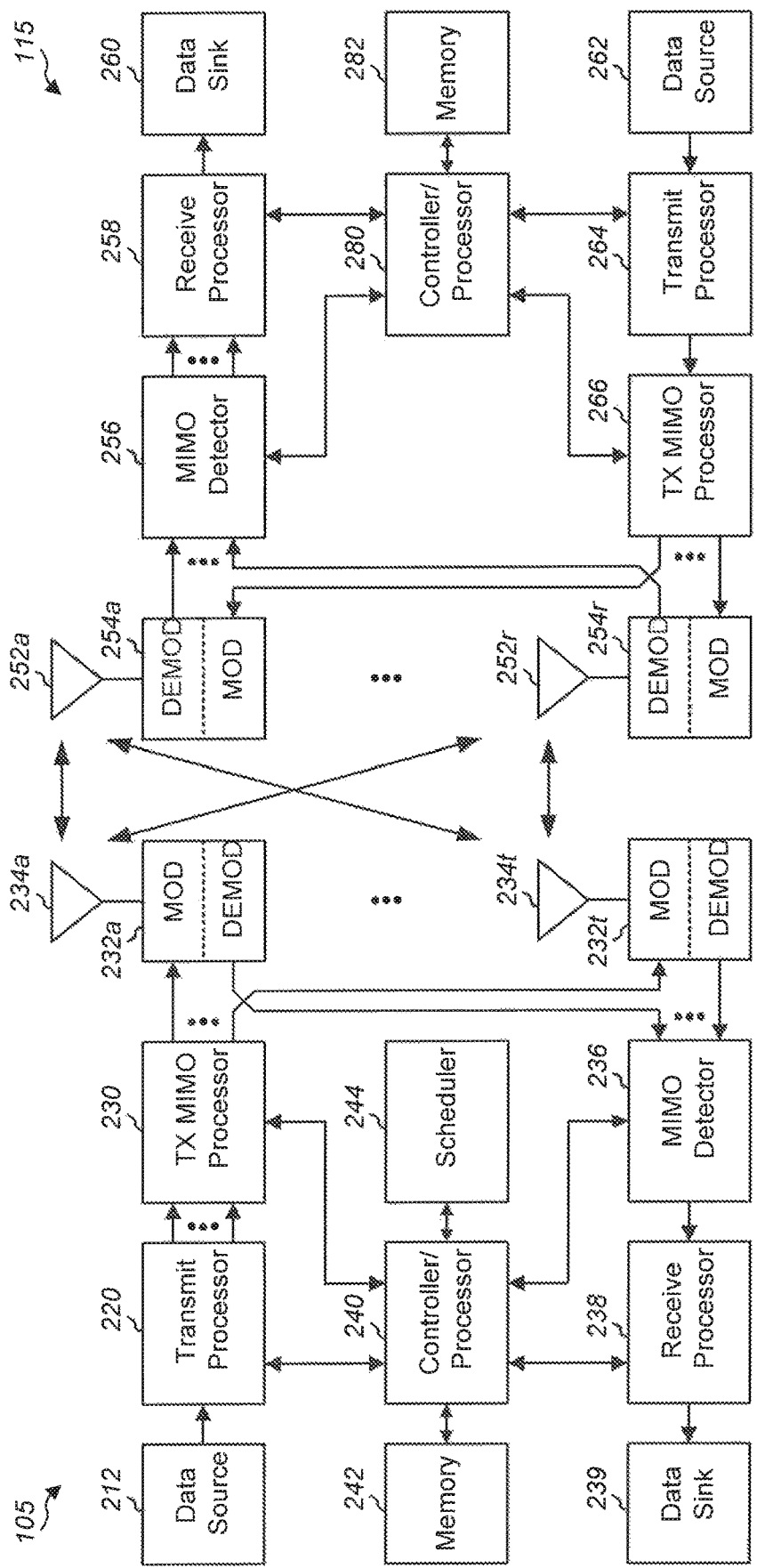
FIG. 2 is a block diagram illustrating a design of a base station and a UE configured according to one aspect of the present disclosure.

FIG. 2 shows a block diagram of a design of a base station 105 and a UE 115, which may be one of the base station and one of the UEs in FIG. 1. At the base station 105, a transmit processor 220 may receive data from a data source 212 and control information from a controller/processor 240. The control information may be for the PBCH, PCFICH, PHICH, PDCCH, EPDCCH, MPDCCH etc. The data may be for the PDSCH, etc. The transmit processor 220 may process (e.g., encode and symbol map) the data and control information to obtain data symbols and control symbols, respectively. The transmit processor 220 may also generate reference symbols, e.g., for the PSS, SSS, and cell-specific reference signal. A transmit (TX) multiple-input multiple-output (MIMO) processor 230 may perform spatial processing (e.g., precoding) on the data symbols, the control symbols, and/or the reference symbols, if applicable, and may provide output symbol streams to the modulators (MODs) 232a through 232t. Each modulator 232 may process a respective output symbol stream (e.g., for OFDM, etc.) to obtain an output sample stream. Each modulator 232 may further process (e.g., convert to analog, amplify, filter, and upconvert) the output sample stream to obtain a downlink signal. Downlink signals from modulators 232a through 232t may be transmitted via the antennas 234a through 234t, respectively.

At the UE 115, the antennas 252a through 252r may receive the downlink signals from the base station 105 and may provide received signals to the demodulators (DEMODs) 254a through 254r, respectively. Each demodulator 254 may condition (e.g., filter, amplify, downconvert, and digitize) a respective received signal to obtain input samples. Each demodulator 254 may further process the input samples (e.g., for OFDM, etc.) to obtain received symbols. A MIMO detector 256 may obtain received symbols from all the demodulators 254a through 254r, perform MIMO detection on the received symbols if applicable, and provide detected symbols.

A receive processor 258 may process (e.g., demodulate, deinterleave, and decode) the detected symbols, provide decoded data for the UE 115 to a data sink 260, and provide decoded control information to a controller/processor 280.

On the uplink, at the UE 115, a transmit processor 264 may receive and process data (e.g., for the PUSCH) from a data source 262 and control information (e.g., for the PUCCH) from the controller/processor 280. The transmit processor 264 may also generate reference symbols for a reference signal. The symbols from the transmit processor 264 may be precoded by a TX MIMO processor 266 if applicable, further processed by the modulators 254a through 254r (e.g., for SC-FDM, etc.), and transmitted to the base station 105. At the base station 105, the uplink signals from the UE 115 may be received by the antennas 234, processed by the demodulators 232, detected by a MIMO detector 236 if applicable, and further processed by a receive processor 238 to obtain decoded data and control information sent by the UE 115. The processor 238 may provide the decoded data to a data sink 239 and the decoded control information to the controller/processor 240.

The controllers/processors 240 and 280 may direct the operation at the base station 105 and the UE 115, respectively. The controller/processor 240 and/or other processors and modules at the base station 105 may perform or direct the execution of various processes for the techniques described herein. The controllers/processor 280 and/or other processors and modules at the UE 115 may also perform or direct the execution of the functional blocks illustrated in FIGS. 5A, 5B, and 7, and/or other processes for the techniques described herein. The memories 242 and 282 may store data and program codes for the base station 105 and the UE 115, respectively. A scheduler 244 may schedule UEs for data transmission on the downlink and/or uplink.

Wireless communications systems operated by different network operating entities (e.g., network operators) may share spectrum. In some instances, a network operating entity may be configured to use an entirety of a designated shared spectrum for at least a period of time before another network operating entity uses the entirety of the designated shared spectrum for a different period of time. Thus, in order to allow network operating entities use of the full designated shared spectrum, and in order to mitigate interfering communications between the different network operating entities, certain resources (e.g., time) may be partitioned and allocated to the different network operating entities for certain types of communication.

For example, a network operating entity may be allocated certain time resources reserved for exclusive communication by the network operating entity using the entirety of the shared spectrum. The network operating entity may also be allocated other time resources where the entity is given priority over other network operating entities to communicate using the shared spectrum. These time resources, prioritized for use by the network operating entity, may be utilized by other network operating entities on an opportunistic basis if the prioritized network operating entity does not utilize the resources. Additional time resources may be allocated for any network operator to use on an opportunistic basis.

Access to the shared spectrum and the arbitration of time resources among different network operating entities may be centrally controlled by a separate entity, autonomously determined by a predefined arbitration scheme, or dynamically determined based on interactions between wireless nodes of the network operators.

In some cases, UE 115 and base station 105 may operate in a shared radio frequency spectrum band, which may include licensed or unlicensed (e.g., contention-based) frequency spectrum. In an unlicensed frequency portion of the shared radio frequency spectrum band, UEs 115 or base stations 105 may traditionally perform a medium-sensing procedure to contend for access to the frequency spectrum. For example, UE 115 or base station 105 may perform a listen before talk (LBT) procedure such as a clear channel assessment (CCA) prior to communicating in order to determine whether the shared channel is available. A CCA may include an energy detection procedure to determine whether there are any other active transmissions. For example, a device may infer that a change in a received signal strength indicator (RSSI) of a power meter indicates that a channel is occupied. Specifically, signal power that is concentrated in a certain bandwidth and exceeds a predetermined noise floor may indicate another wireless transmitter. A CCA also may include detection of specific sequences that indicate use of the channel. For example, another device may transmit a specific preamble prior to transmitting a data sequence. In some cases, an LBT procedure may include a wireless node adjusting its own backoff window based on the amount of energy detected on a channel and/or the acknowledge/ negative-acknowledge (ACK/NACK) feedback for its own transmitted packets as a proxy for collisions.

Use of a medium-sensing procedure to contend for access to an unlicensed shared spectrum may result in communication inefficiencies. This may be particularly evident when multiple network operating entities (e.g., network operators) are attempting to access a shared resource. In 5G network 100, base stations 105 and UEs 115 may be operated by the same or different network operating entities. In some examples, an individual base station 105 or UE 115 may be operated by more than one network operating entity. In other examples, each base station 105 and UE 115 may be operated by a single network operating entity. Requiring each base station 105 and UE 115 of different network operating entities to contend for shared resources may result in increased signaling overhead and communication latency.

Figure 3:
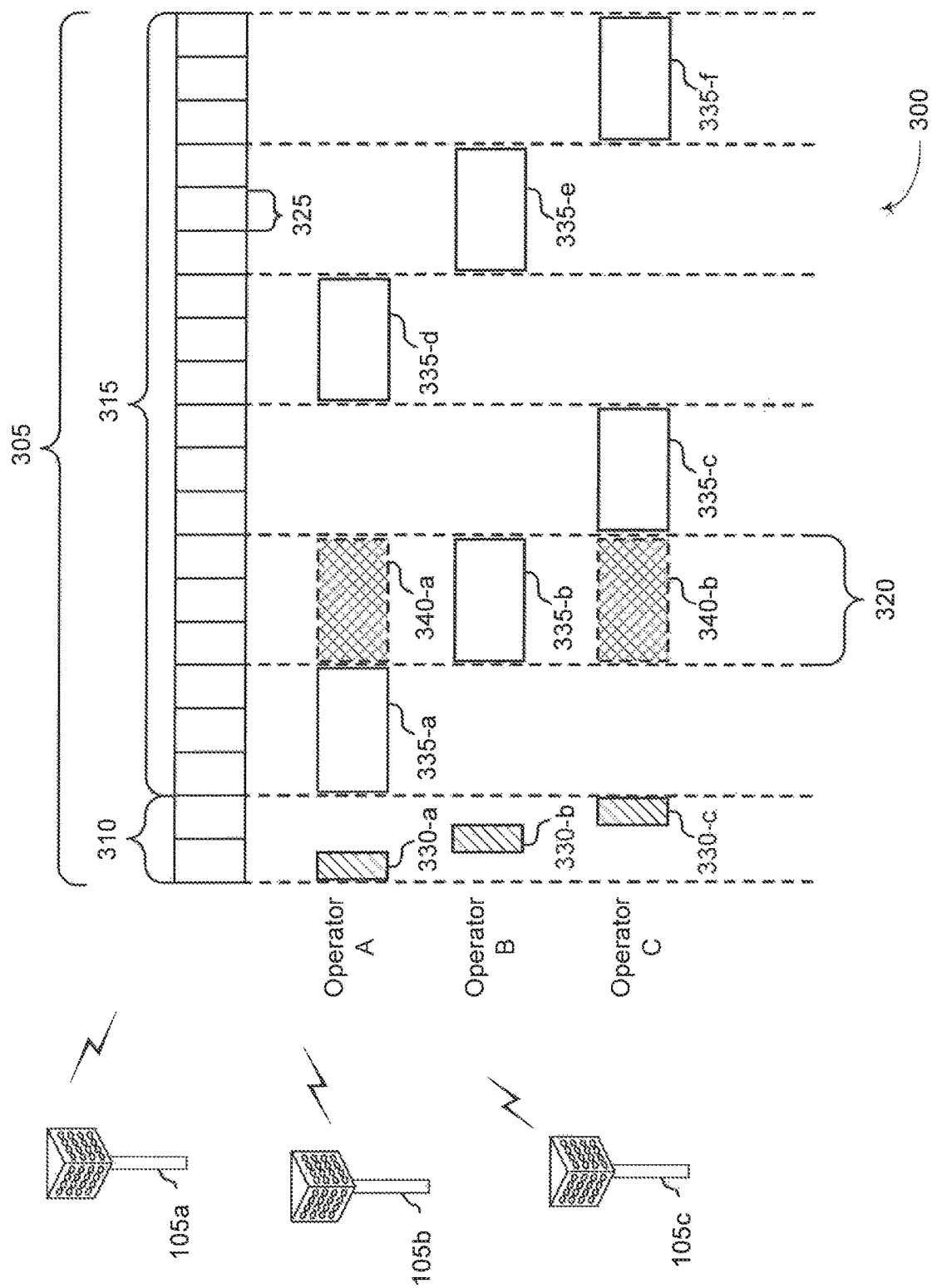
FIG. 3 illustrates an example of a timing diagram for coordinated resource partitioning.

FIG. 3 illustrates an example of a timing diagram 300 for coordinated resource partitioning. The timing diagram 300 includes a superframe 305, which may represent a fixed duration of time (e.g., 20 ms). Superframe 305 may be repeated for a given communication session and may be used by a wireless system such as 5G network 100 described with reference to FIG. 1. The superframe 305 may be divided into intervals such as an acquisition interval (A-INT) 310 and an arbitration interval 315. As described in more detail below, the A-INT 310 and arbitration interval 315 may be subdivided into sub-intervals, designated for certain resource types, and allocated to different network operating entities to facilitate coordinated communications between the different network operating entities. For example, the arbitration interval 315 may be divided into a plurality of sub-intervals 320. Also, the superframe 305 may be further divided into a plurality of subframes 325 with a fixed duration (e.g., 1 ms). While timing diagram 300 illustrates three different network operating entities (e.g., Operator A, Operator B, Operator C), the number of network operating entities using the superframe 305 for coordinated communications may be greater than or fewer than the number illustrated in timing diagram 300.

The A-INT 310 may be a dedicated interval of the superframe 305 that is reserved for exclusive communications by the network operating entities. In some examples, each network operating entity may be allocated certain resources within the A-INT 310 for exclusive communications. For example, resources 330-a may be reserved for exclusive communications by Operator A, such as through base station 105a, resources 330-b may be reserved for exclusive communications by Operator B, such as through base station 105b, and resources 330-c may be reserved for exclusive communications by Operator C, such as through base station 105c. Since the resources 330-a are reserved for exclusive communications by Operator A, neither Operator B nor Operator C can communicate during resources 330-a, even if Operator A chooses not to communicate during those resources. That is, access to exclusive resources is limited to the designated network operator. Similar restrictions apply to resources 330-b for Operator B and resources 330-c for Operator C. The wireless nodes of Operator A (e.g, UEs 115 or base stations 105) may communicate any information desired during their exclusive resources 330-a, such as control information or data.

When communicating over an exclusive resource, a network operating entity does not need to perform any medium sensing procedures (e.g., listen-before-talk (LBT) or clear channel assessment (CCA)) because the network operating entity knows that the resources are reserved. Because only the designated network operating entity may communicate over exclusive resources, there may be a reduced likelihood of interfering communications as compared to relying on medium sensing techniques alone (e.g., no hidden node problem). In some examples, the A-INT 310 is used to transmit control information, such as synchronization signals (e.g., SYNC signals), system information (e.g., system information blocks (SIBs)), paging information (e.g., physical broadcast channel (PBCH) messages), or random access information (e.g., random access channel (RACH) signals). In some examples, all of the wireless nodes associated with a network operating entity may transmit at the same time during their exclusive resources.

In some examples, resources may be classified as prioritized for certain network operating entities. Resources that are assigned with priority for a certain network operating entity may be referred to as a guaranteed interval (G-INT) for that network operating entity. The interval of resources used by the network operating entity during the G-INT may be referred to as a prioritized sub-interval. For example, resources 335-a may be prioritized for use by Operator A and may therefore be referred to as a G-INT for Operator A (e.g., G-INT-OpA). Similarly, resources 335-b may be prioritized for Operator B, resources 335-c may be prioritized for Operator C, resources 335-d may be prioritized for Operator A, resources 335-e may be prioritized for Operator B, and resources 335-f may be prioritized for operator C.

The various G-INT resources illustrated in FIG. 3 appear to be staggered to illustrate their association with their respective network operating entities, but these resources may all be on the same frequency bandwidth. Thus, if viewed along a time-frequency grid, the G-INT resources may appear as a contiguous line within the superframe 305. This partitioning of data may be an example of time division multiplexing (TDM). Also, when resources appear in the same sub-interval (e.g., resources 340-a and resources 335-b), these resources represent the same time resources with respect to the superframe 305 (e.g., the resources occupy the same sub-interval 320), but the resources are separately designated to illustrate that the same time resources can be classified differently for different operators.

When resources are assigned with priority for a certain network operating entity (e.g., a G-INT), that network operating entity may communicate using those resources without having to wait or perform any medium sensing procedures (e.g., LBT or CCA). For example, the wireless nodes of Operator A are free to communicate any data or control information during resources 335-a without interference from the wireless nodes of Operator B or Operator C.

A network operating entity may additionally signal to another operator that it intends to use a particular G-INT. For example, referring to resources 335-a, Operator A may signal to Operator B and Operator C that it intends to use resources 335-a. Such signaling may be referred to as an activity indication. Moreover, since Operator A has priority over resources 335-a, Operator A may be considered as a higher priority operator than both Operator B and Operator C. However, as discussed above, Operator A does not have to send signaling to the other network operating entities to ensure interference-free transmission during resources 335-a because the resources 335-a are assigned with priority to Operator A.

Similarly, a network operating entity may signal to another network operating entity that it intends not to use a particular G-INT. This signaling may also be referred to as an activity indication. For example, referring to resources 335-b, Operator B may signal to Operator A and Operator C that it intends not to use the resources 335-*b* for communication, even though the resources are assigned with priority to Operator B. With reference to resources 335-*b*, Operator B may be considered a higher priority network operating entity than Operator A and Operator C. In such cases, Operators A and C may attempt to use resources of sub-interval 320 on an opportunistic basis. Thus, from the perspective of Operator A, the sub-interval 320 that contains resources 335-*b* may be considered an opportunistic interval (O-INT) for Operator A (e.g., O-INT-OpA). For illustrative purposes, resources 340-*a* may represent the O-INT for Operator A. Also, from the perspective of Operator C, the same sub-interval 320 may represent an O-INT for Operator C with corresponding resources 340-*b*. Resources 340-*a*, 335-*b*, and 340-*b* all represent the same time resources (e.g., a particular sub-interval 320), but are identified separately to signify that the same resources may be considered as a G-INT for some network operating entities and yet as an O-INT for others.

To utilize resources on an opportunistic basis, Operator A and Operator C may perform medium-sensing procedures to check for communications on a particular channel before transmitting data. For example, if Operator B decides not to use resources 335-*b* (e.g., G-INT-OpB), then Operator A may use those same resources (e.g., represented by resources 340-*a*) by first checking the channel for interference (e.g., LBT) and then transmitting data if the channel was determined to be clear. Similarly, if Operator C wanted to access resources on an opportunistic basis during sub-interval 320 (e.g., use an O-INT represented by resources 340-*b*) in response to an indication that Operator B was not going to use its G-INT, Operator C may perform a medium sensing procedure and access the resources if available. In some cases, two operators (e.g., Operator A and Operator C) may attempt to access the same resources, in which case the operators may employ contention-based procedures to avoid interfering communications. The operators may also have sub-priorities assigned to them designed to determine which operator may gain access to resources if more than operator is attempting access simultaneously.

In some examples, a network operating entity may intend not to use a particular G-INT assigned to it, but may not send out an activity indication that conveys the intent not to use the resources.

In such cases, for a particular sub-interval 320, lower priority operating entities may be configured to monitor the channel to determine whether a higher priority operating entity is using the resources. If a lower priority operating entity determines through LBT or similar method that a higher priority operating entity is not going to use its G-INT resources, then the lower priority operating entities may attempt to access the resources on an opportunistic basis as described above.

In some examples, access to a G-INT or O-INT may be preceded by a reservation signal (e.g., request-to-send (RTS)/clear-to-send (CTS)), and the contention window (CW) may be randomly chosen between one and the total number of operating entities.

In some examples, an operating entity may employ or be compatible with coordinated multipoint (CoMP) communications. For example an operating entity may employ CoMP and dynamic time division duplex (TDD) in a G-INT and opportunistic CoMP in an O-INT as needed.

In the example illustrated in FIG. 3, each sub-interval 320 includes a G-INT for one of Operator A, B, or C. However, in some cases, one or more sub-intervals 320 may include resources that are neither reserved for exclusive use nor reserved for prioritized use (e.g., unassigned resources). Such unassigned resources may be considered an O-INT for any network operating entity, and may be accessed on an opportunistic basis as described above.

In some examples, each subframe 325 may contain 14 symbols (e.g., 250-µs for 60 kHz tone spacing). These subframes 325 may be standalone, self-contained Interval-Cs (ITCs) or the subframes 325 may be a part of a long ITC. An ITC may be a self-contained transmission starting with a downlink transmission and ending with a uplink transmission. In some embodiments, an ITC may contain one or more subframes 325 operating contiguously upon medium occupation. In some cases, there may be a maximum of eight network operators in an A-INT 310 (e.g., with duration of 2 ms) assuming a 250 µs transmission opportunity.

Although three operators are illustrated in FIG. 3, it should be understood that fewer or more network operating entities may be configured to operate in a coordinated manner as described above. In some cases, the location of the G-INT, O-INT, or A-INT within superframe 305 for each operator is determined autonomously based on the number of network operating entities active in a system. For example, if there is only one network operating entity, each sub-interval 320 may be occupied by a G-INT for that single network operating entity, or the sub-intervals 320 may alternate between G-INTs for that network operating entity and O-INTs to allow other network operating entities to enter. If there are two network operating entities, the sub-intervals 320 may alternate between G-INTs for the first network operating entity and G-INTs for the second network operating entity. If there are three network operating entities, the G-INT and O-INTs for each network operating entity may be designed as illustrated in FIG. 3. If there are four network operating entities, the first four sub-intervals 320 may include consecutive G-INTs for the four network operating entities and the remaining two sub-intervals 320 may contain O-INTs. Similarly, if there are five network operating entities, the first five sub-intervals 320 may contain consecutive G-INTs for the five network operating entities and the remaining sub-interval 320 may contain an O-INT. If there are six network operating entities, all six sub-intervals 320 may include consecutive G-INTs for each network operating entity. It should be understood that these examples are for illustrative purposes only and that other autonomously determined interval allocations may be used.

It should be understood that the coordination framework described with reference to FIG. 3 is for illustration purposes only. For example, the duration of superframe 305 may be more or less than 20 ms. Also, the number, duration, and location of sub-intervals 320 and subframes 325 may differ from the configuration illustrated. Also, the types of resource designations (e.g., exclusive, prioritized, unassigned) may differ or include more or less sub-designations.

Wireless operations that use coordinated multipoint (CoMP) transmissions include a range of different techniques that enable the dynamic coordination of transmission and reception over a variety of different base stations. CoMP generally falls into two major categories: joint processing, where there is coordination between multiple entities—base stations—that are simultaneously transmitting or receiving to or from UEs; and coordinated scheduling or beamforming, where a UE transmits with a single transmission or reception point, while the communication is made with an exchange of control among several coordinated entities. The joint processing form of CoMP also includes a subclass referred to as joint transmission, in which UE data is simultaneously process and transmitted from multiple cooperating base stations. In heterogeneous and dense small cell network scenarios with low power nodes, UEs may experience significant signal strength simultaneously from multiple base stations. In order to manage both downlink and uplink joint transmission CoMP, accurate and up-to-date channel state information (CSI) feedback is used.

Figure 4A:
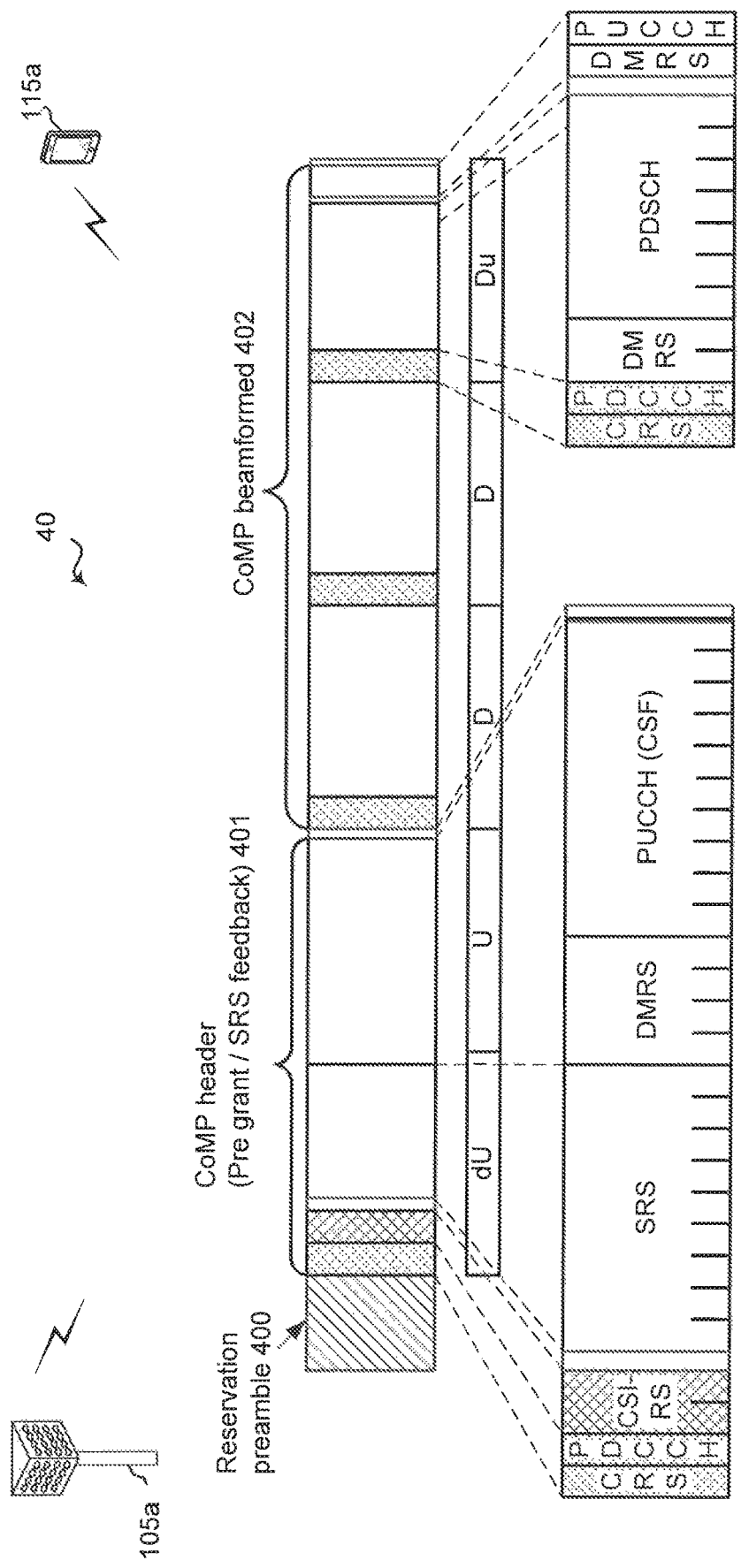
FIGS. 4A and 4B are block diagrams illustrating CoMP downlink and uplink data transmissions between a base station and a UE.
Figure 4B:
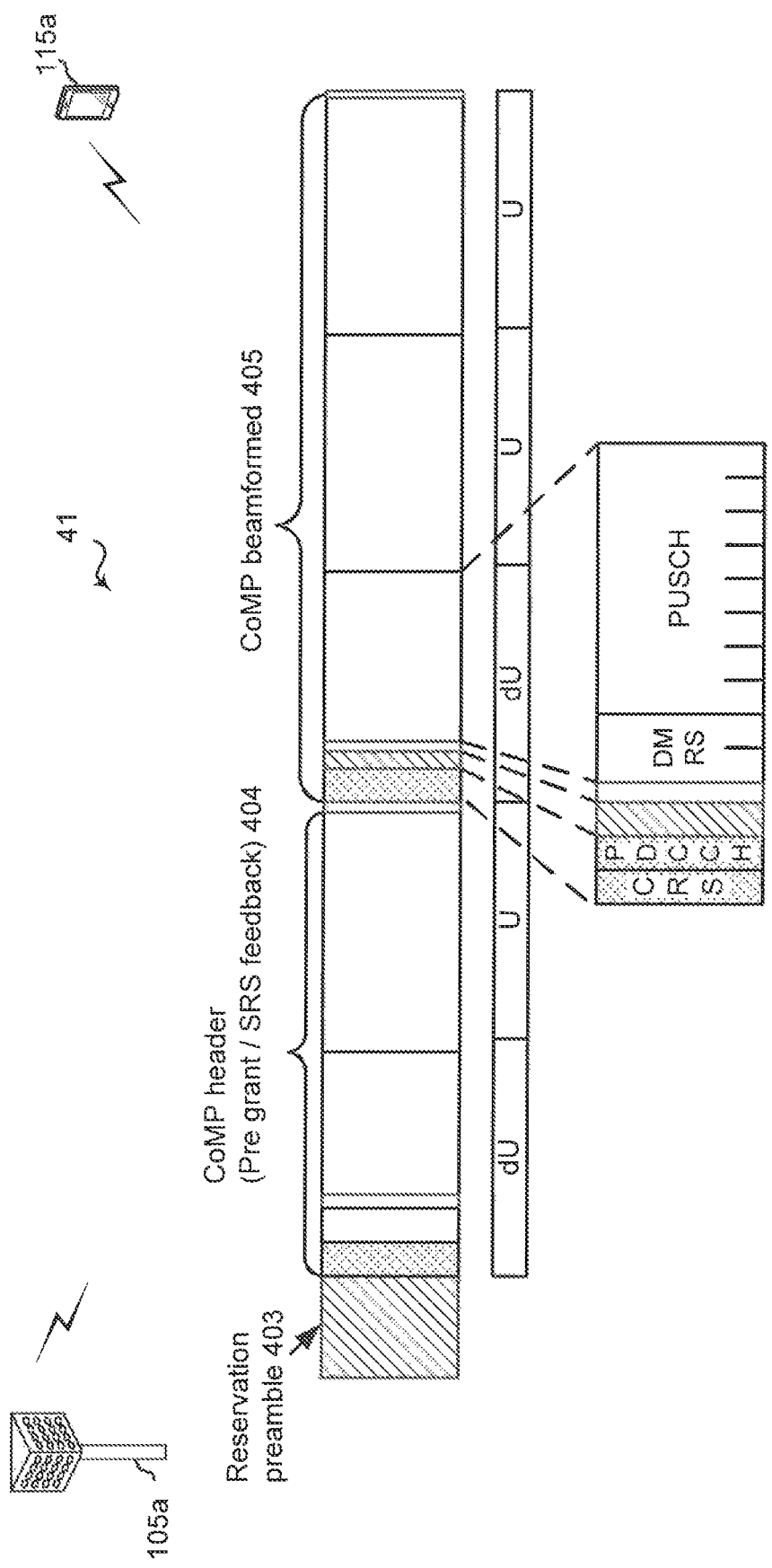

FIGS. 4A and 4B are block diagrams illustrating CoMP downlink and uplink data transmissions 40 and 41 between a base station 105a and UE 115a. Base station 105a and UE 115a participate in communications over a shared spectrum, such as according to NR-SS operations. Prior to communicating on the shared spectrum, the transmitting entity, base station 105a in FIG. 4A and UE 115a in FIG. 4B, performs an LBT procedure in reservation preambles 400 and 403. Once the channel has been secured, at the beginning of each of downlink CoMP data transmission 40 and uplink CoMP data transmission 41, sounding reference signal (SRS) feedback is transmitted by UE 115a within CoMP header 401 and 404. CoMP headers 401 and 404 include a downlink "pre-grant" of a SRS/channel state feedback (CSF) request, CSI-RS, along with an UL "pre-grant ACK," including the SRS and CSF (PUCCH) response to the request. The uplink CoMP operation is reciprocal to the downlink CoMP operation. Remote transmission points communicate in-phase and quadrature (I/Q) samples to a central base station. On the downlink, the base stations in the CoMP set jointly process the signal-to-leakage ratio (SLR) beamforming into the communication channel including the minimum mean square equalization (MMSE). On the uplink side, precoding is performed onto the channel again with MMSE equalization for the SLR beamforming.

In general, within the downlink CoMP operations (FIG. 4A), a base station, such as base station 105a, chooses UEs, such as UE 115a, to schedule and requests SRS feedback ("pre-grant"). UE 115a transmits SRS in addition to DMRS and the CSF within the PUCCH of downlink CoMP header 401. Base station 105a determines the SLR beams and modulation coding scheme (MCS) based on the SRS. Downlink beamformed data 402 includes downlink transmissions of control/data (e.g., CRS, downlink grants in the PDCCH, DMRS, PDSCH), which are transmitted via SLR-beamforming. At the end of downlink CoMP beamformed data 402, base station 105a receives uplink acknowledgement via the DMRS and PUCCH, which are received via MMSE (SLR) equalization.

Within the uplink CoMP operations (FIG. 4B), base station chooses to schedule UE 115a and requests SRS feedback ("pre-grant") within uplink CoMP header 404. UE 115a transmits SRS for the "pre-grant ACK" in uplink CoMP header 400, after which base station 105a determines the SLR beams and MCS. Downlink controls, such as CRS, uplink grants, and the like, may also be transmitted via SLR-beamforming. After uplink CoMP header 404, the data are received in uplink CoMP beamformed data 405 with DMRS and PUSCH via MMSE (SLR) equalization.

CoMP performance is mainly limited by channel accuracy at the base station as it affects beam selection. For each transmission opportunity, a phase synchronization is performed in the beginning of the transmission opportunity. However, a single phase synchronization per transmission opportunity may not be sufficient when the phase drift within the transmission opportunity is non-negligible. Because CoMP operations rely on the interoperations between multiple base stations, the phase coherence is much more strict as compared to single point processing. Non-negligible phase drift over the transmission opportunity can greatly degrade the CoMP performance. Accordingly, solutions have been suggested that provide a phase compensation reference signal (PCSR) that may be transmitted when the phase drift exceeds a predetermined threshold. The PCRS allows the base station or other transmitting node to compensate for the phase drift.

In general, CoMP joint transmission operations take advantage of the channel reciprocity that exists between the uplink and downlink channels. Accordingly, CoMP operations use very accurate gain and phase control. Calibration operations are used to counter gain/phase mismatches that arises between the transmit and receive operations. However, calibration operations are typically performed infrequently (e.g., every 1 minute, 1 hour, 1 day etc.). Phase synchronization may occur across multiple base stations. The clocks of each of the base stations may have different jitter, such that at each listen before talk (LBT) opportunity, a different base station may reflect a different phase. For purposes of this application an assumption will be made that the calibration has already been performed. The various aspects of the present disclosure will address the phase synchronization problem across base stations at each LBT.

Solutions have been suggested that address phase synchronization through inter-gNB cooperation. In such suggested solutions, the gNBs of the CoMP set are divided into two sets. The first set sends a first PSRS, and then after a small gap, the second set 2 sends a second PSRS. The phase and timing drift may be determined by measuring the differences between the first and second PSRS.

Another suggested solution provides for UE-assisted operations for phase synchronization. In a first approach, downlink PSRS are transmitted to a UE, the UE analyzes the downlink channel based on the downlink PSRS and modulates an uplink PSRS using the downlink channel estimate. Thus, the uplink PSRS carries analog feedback of the downlink PSRS channel estimate and the base station may then determine the phase drift based on a comparison and measurement of the uplink PSRS and the downlink PSRS channel estimate. In a second approach to the UE-assisted operation, the roles of modulation are reversed. The UE transmits an uplink PSRS. The base station receiving the uplink PSRS estimates the uplink channel and then modulates a downlink PSRS using the estimated uplink channel and, thus, carrier the analog feedback of the uplink PSRS estimate. The UE calculates the phase and timing difference and feeds back the calculated phase and timing difference to the eNB, such as via PUSCH or PUCCH.

It should be noted that in execution of such operations, the uplink PSRS from the UE may correspond to an SRS, while the downlink PSRS from the base station may correspond to a CSI-RS.

Various aspects of the present disclosure are directed to reporting of co-phasing feedback that identifies a co-phasing term between pairs of transmission and reception points, such as base stations and UE. For example, based on CSI-RS transmitted from the base stations in a CoMP group, a UE can compute optimal co-phasing terms between the pairs base stations in the CoMP group from the downlink channel point of view. Similarly, based on the SRS transmitted from UEs within the coverage area of the CoMP group, the base station can compute an optimal co-phasing term between the SRS sent by the UE and received by a pair of base stations from an uplink channel point of view. The delta or difference between the two co-phasing terms is the phase correction value. The co-phasing term feedback may be wideband or per-subband depending on the symbol timing drift between the transmission points of base stations. During operations, the order of transmission is not restricted or limited to either the UE transmitting first or the base station transmitting first. Either node may transmit the first PSRS.

Figures 5A, 5B:
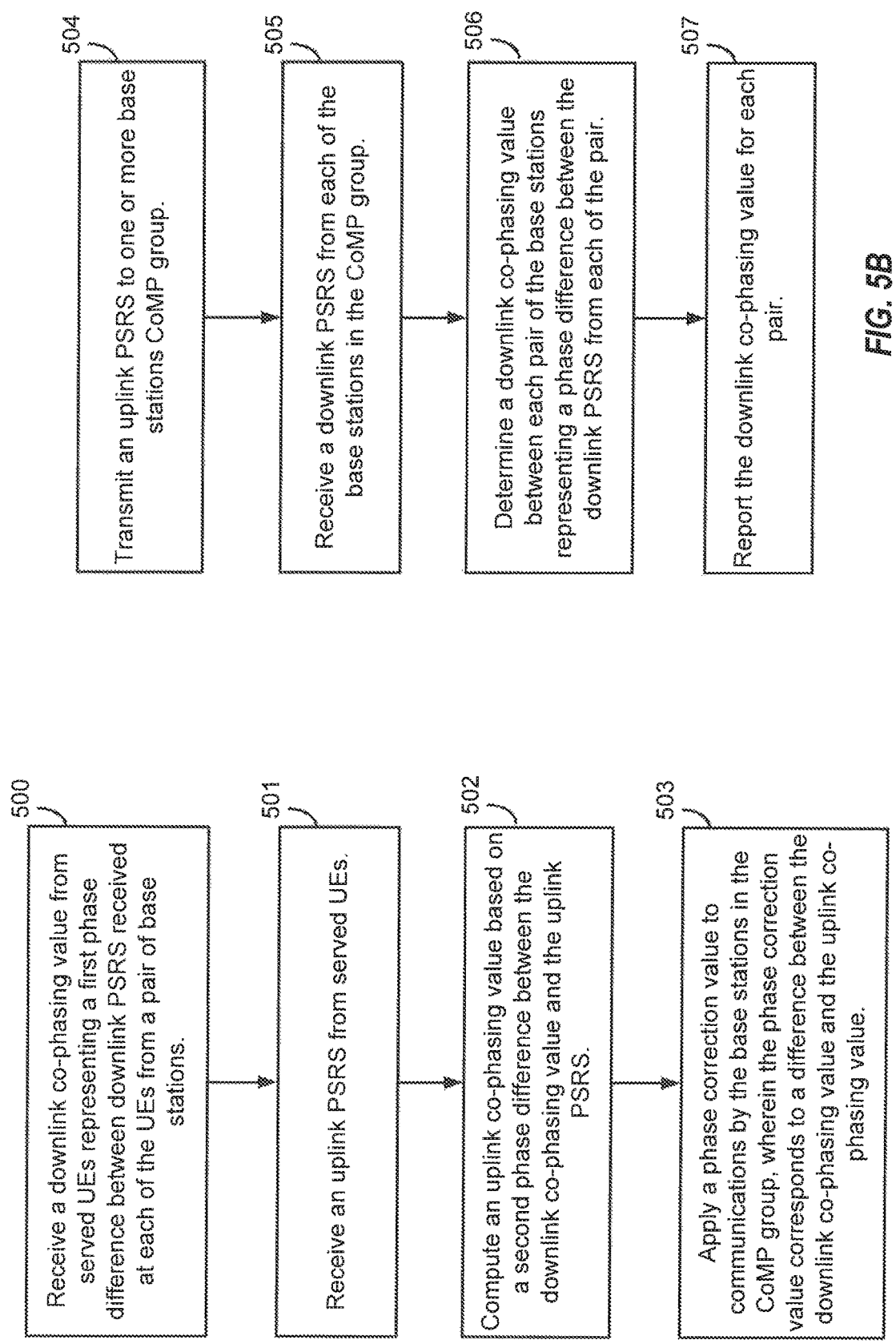
FIGS. 5A and 5B are example blocks executed to implement aspects of the present disclosure.
Figure 8:
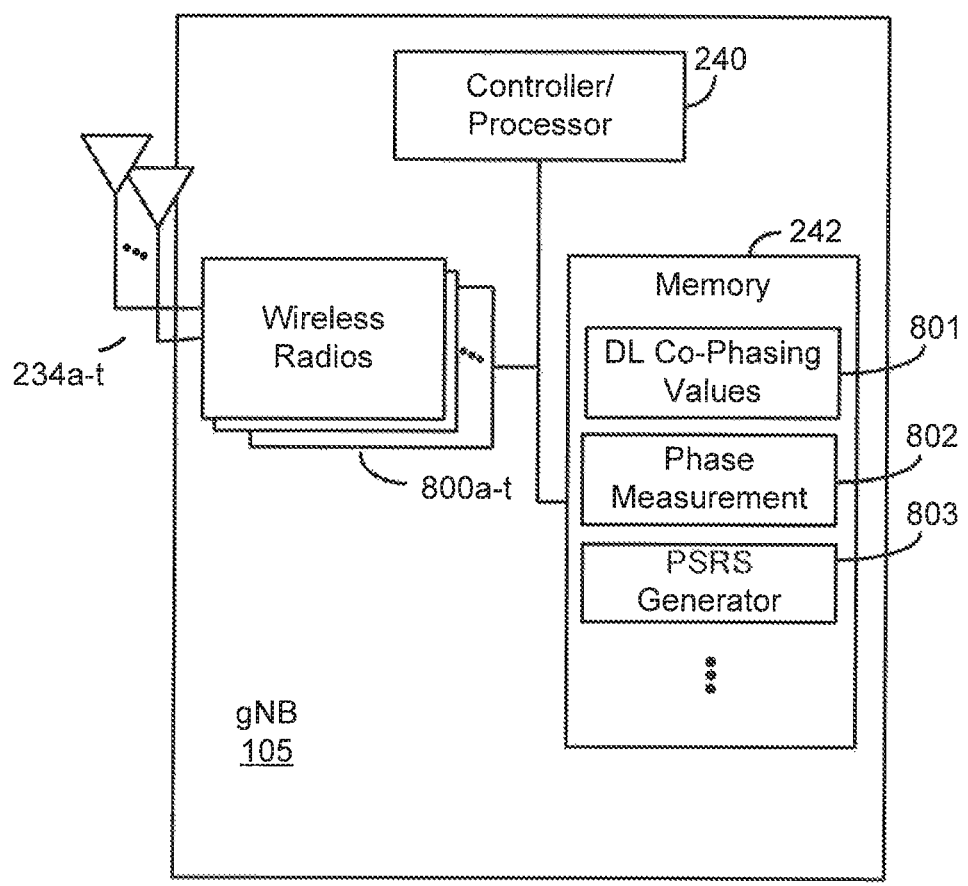
FIG. 8 is a block diagram illustrating an eNB configured according to one aspect of the present disclosure.

FIGS. 5A and 5B are example blocks executed to implement aspects of the present disclosure. FIG. 5A illustrates the example blocks executed from the base station perspective. The example blocks will also be described with respect to gNB 105 as illustrated in FIG. 8. FIG. 8 is a block diagram illustrating gNB 105 configured according to one aspect of the present disclosure. gNB 105 includes the structure, hardware, and components as illustrated for gNB 105 of FIG. 2. For example, gNB 105 includes controller/processor 240, which operates to execute logic or computer instructions stored in memory 242, as well as controlling the components of gNB 105 that provide the features and functionality of gNB 105. gNB 105, under control of controller/processor 240, transmits and receives signals via wireless radios 800a-t and antennas 234a-t. Wireless radios 800a-t includes various components and hardware, as illustrated in FIG. 2 for gNB 105, including modulator/demodulators 232a-t, MIMO detector 236, receive processor 238, transmit processor 220, and TX MIMO processor 230.

At block 500, a base station receives a downlink co-phasing value from served UEs representing a first phase difference between downlink PSRS received at each of the UEs from a pair of base stations. For example, gNB 105 receives the downlink co-phasing value from served UEs via antennas 234a-t and wireless radios 800a-t and stores the downlink co-phasing values at 801 in memory 242. The downlink co-phasing values that are transmitted by the UEs and received at gNB 105 an other base stations of the CoMP group are based on the phase difference between pairs of downlink PSRS transmitted by gNB 105 and the other base stations of the CoMP group. Each of the base stations in the CoMP group transmits downlink PSRS (e.g., CSI-RS). For example, base station 105, under control of controller/processor 240, activates PSRS generator 803, stored in memory 242. The execution environment of PSRS generator 803 allows for the generation of a PSRS signal for transmission from base station 105 via wireless radios 800a-t and antennas 234a-t. The UEs receiving these downlink PSRS from the base stations, such as gNB 105 compute co-phasing values as a phase difference between pairs of the base stations and reports those co-phasing values to one or more of the base stations in the CoMP group. In one example, the downlink co-phasing value may correspond to the angle difference between the downlink PSRS of the base station pair.

At block 501, the base station receives an uplink PSRS from the served UEs. The UEs each transmit an uplink PSRS (e.g., SRS for sounding the channel). The base stations, such as base station 105, receives the uplink PSRS via antennas 234a-t and wireless radios 800a-t. At block 502, the base station computes an uplink co-phasing value based on a second phase difference between the uplink PSRS received at a pair of the base stations. For example, phase measurement 802, stored in memory 242 is executed by gNB 105 under control of controller/processor 240. Using the uplink PSRS (e.g., SRS) received by the pair of base stations and sent by the same UE, such as through execution of PSRS generator 902, wireless radios 900a-r, and antennas 234a-t, the execution environment of phase measurement 802 allows gNB 105 to compute an uplink co-phasing value as a phase difference between two of the uplink PSRS sent by the UE. In one example, the uplink co-phasing value may correspond to the angle difference between the two uplink PSRS of the UE received at the pair of base stations.

At block 503, the base station applies a phase correction value to communications by the base stations in the CoMP group, wherein the phase correction value corresponds to a difference between the downlink co-phasing value and the uplink co-phasing value. For example, gNB 105, under control of controller/processor 240, can determine the phase correction value by comparing and computing the difference between the uplink and downlink co-phasing values through execution of phase measurement 802. That correction value may be used among the base stations of the CoMP group to adjust communications accordingly, such as by adjusting the phase and timing at wireless radios 800a-t.

Figure 9:
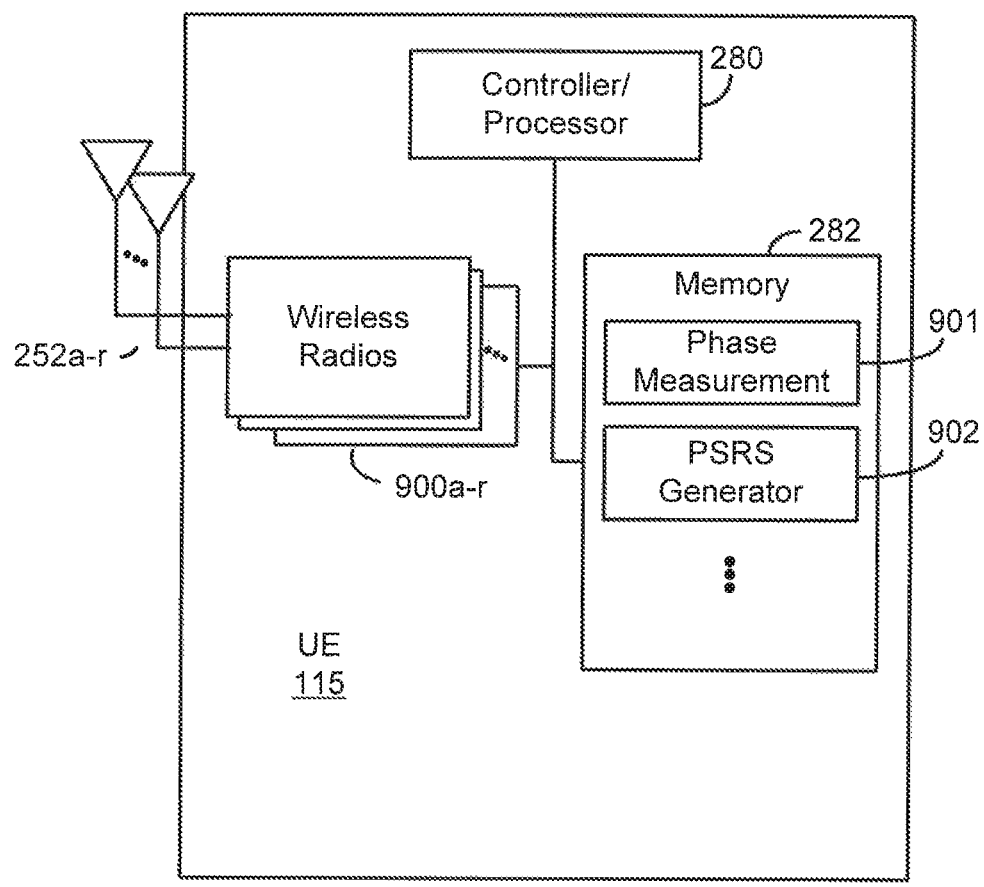
FIG. 9 is a block diagram illustrating a UE configured according to one aspect of the present disclosure.

FIG. 5B illustrates the example blocks executed by a UE being served by a CoMP group of base stations according to one aspect of the disclosure. The example blocks will also be described with respect to UE 115 as illustrated in FIG. 9. FIG. 9 is a block diagram illustrating UE 115 configured according to one aspect of the present disclosure. UE 115 includes the structure, hardware, and components as illustrated for UE 115 of FIG. 2. For example, UE 115 includes controller/processor 280, which operates to execute logic or computer instructions stored in memory 282, as well as controlling the components of UE 115 that provide the features and functionality of UE 115. UE 115, under control of controller/processor 280, transmits and receives signals via wireless radios 900a-r and antennas 252a-r. Wireless radios 900a-r includes various components and hardware, as illustrated in FIG. 2 for UE 115, including modulator/demodulators 254a-r, MIMO detector 256, receive processor 258, transmit processor 264, and TX MIMO processor 266.

At block 504, the UE transmits an uplink PSRS to the base stations of the CoMP group. The UE transmits the uplink PSRS, which may be an SRS. For example, UE 115, under control of controller/processor 280, executes PSRS generator 902, stored in memory 282. The execution environment of PSRS generator 902 generates a PSRS (e.g., an SRS) for transmission via wireless radios 900a-r and antennas 252a-r. As indicated with regard to FIG. 5A, each base station of the CoMP group will receive the uplink PSRS. The uplink co-phasing value may be determined by computing the phase difference between the uplink PSRS as received by a pair of the base stations in the CoMP group.

At block 505, the UE receives a downlink PSRS from each of the base stations in the CoMP group. For example, UE 115 will receive a downlink PSRS from the multiple base stations operating in the CoMP group using antennas 252a-r and wireless radios 900a-r. The downlink PSRS may correspond to CSI-RS transmitted by the base stations. At block 506, the UE determines a downlink co-phasing value between each pair of the base stations representing a phase difference between the downlink PSRS from each of the pair. UE 115, under control of controller/processor 280, executes phase measurement 901, stored in memory 282. Through the execution environment of phase measurement 901, UE 115 determines the phase difference between the downlink PSRS from pairs of the different base stations of the CoMP group. Of the plurality of base stations operating in the CoMP group, UE 115 will pair the plurality for determining the co-phasing value, thus, computing a downlink co-phasing value for each of the pair. At block 507, the UE reports the downlink co-phasing value. For example, after determining the downlink co-phasing value, UE 115 will transmit the values via wireless radios 900a-r and antennas 252a-r for each pair.

It should be noted that in operation to synchronize the phase and timing, a few number of base stations of the total in the CoMP group may be involved in determining the phase correction value and adjusting the communications among the CoMP group.

In implementing the various aspects of the present disclosure, the downlink PSRS may be implemented by CSI-RS transmitted from the base stations, while the uplink PSRS may be implemented by SRS transmitted from the UEs. Thus, the downlink channel may be estimated from CSI-RS, and uplink channel may be estimated from SRS.

In one example, the downlink and uplink channels may be estimated according to the following equations:

$$y_{ij}^{t,r} = H_{DL,ij}^{t,r}(k)\left[\exp\left(-\frac{J2\pi k t_j^{DL}}{N}\right)\right]\left[\exp\left(-\frac{J2\pi k \xi_{BT,i}}{n}\right)\exp\left(\frac{J2\pi k \xi_{UR,j}}{N}\right)\right] \quad (1)$$
$$[\exp(-J\varphi_{BT,i})\exp(J\varphi_{UR,j})] + n_j^r(k)$$

$$z_{ji}^{r,t}(k) = H_{UL,ji}^{r,t}(k)\left[\exp\left(-\frac{J2\pi k t_j^{UL}}{N}\right)\right]\left[\exp\left(\frac{J2\pi \xi_{BR,i}}{N}\right)\exp\left(\frac{J2\pi k \xi_{UT,j}}{N}\right)\right] \quad (2)$$
$$[\exp(j\varphi_{BR,i})\exp(-J\varphi_{UT,j})] + w_i^t(k)$$

Where $y_{i,j}$ represent the downlink signal of a base station i to a UE j, and $z_{ji}$ represents the uplink signal of a UE j to a base station i. k represents the specific tone within a set of tones, K, over which the channel estimate will occur. $H_{DL,ij}^{t,r}(k)$=$H_{UL,ji}^{r,t}(k)$ corresponds to the over the air downlink/uplink channel between gNB i, antenna t, to UE j, antenna r at subcarrier k. $\tau_j^{DL}$ corresponds to the timing offset due to UE TTL between transmitter of all the gNBs to UE j receiver. $\xi_{BT,i}$ is the transmitter timing offset introduced by the clock jitter of gNB i. $\xi_{UR,j}$ is the receiver timing offset introduced by the clock jitter of UE j; $\varphi_{BT,i}$ is the phase uncertainty introduced by the clock jitter of gNB i. $\varphi_{UR,j}$ is the phase uncertainty introduced by clock jitter of UE j. $\varphi_{UR,j}$ is the phase uncertainty introduced by clock jitter of UE j. $\tau_j^{UL}$ is the timing offset between UE j transmitter to all the gNB receivers due to gNB i. TTL. $\xi_{BR,L}$ is the receiving timing offset introduced by the clock jitter of gNB i. $\xi_{UT,j}$ is the receiver timing offset introduced by the clock jitter of UE j. $\varphi_{BR,i}$ is the phase uncertainty introduced by the clock jitter of gNB i. $\varphi_{UT,j}$ is the phase uncertainty introduced by clock jitter of UE j. $w_i^t(k)$ is the additive noise of gNB i, antenna t.

In each of equations (1) and (2), the terms represent differing phase and timing drift elements. For reference, each of the different phase and timing drift elements has been bracketed together. For example, the first exponential function corresponds to the symbol timing drift due to the transistor-to-transistor logic (TTL). The second and third exponential functions correspond to the symbol timing drift due to the phase locked loops (PLLs) of the analog-to-digital converter (ADC)/digital-to-analog converter (DAC). The fourth and fifth exponential functions correspond to the phase drift due to the up/down conversion PLL.

UE j gets the downlink channel estimate from gNBs $i_1$ and $i_2$, and calculates:

$$y_{i_1j}^{t,r}(k)\left(y_{i_2j}^{t,r}(k)\right)^* = H_{DL,i_1j}^{t,r}(k)\left(H_{DL,i_2j}^{t,r}(k)\right)^* \quad (3)$$
$$\exp\left(-\frac{J2\pi k(\xi_{BT,i_1} - \xi_{BT,i_2})}{N}\right)\exp(-J(\varphi_{BT,i_1} - \varphi_{BT,i_2}))$$

The UE would then feedback the angle of the difference between gNBs $i_1$ and $i_2$.

gNBs $i_1$ and $i_2$ obtain the uplink channel estimate from UE j, and calculate:

$$z_{ji_1}^{r,t}(k)(z_{ji_2}^{r,t}(k))^* = H_{UL,ji_1}^{r,t}(k)\left(H_{UL,ji_2}^{r,t}(k)\right)^* \quad (4)$$
$$\exp\left(\frac{J2\pi k(\xi_{BR,i_1} - \xi_{BT,i_2})}{N}\right)\exp(J(\varphi_{BR,i_1} - \varphi_{br,i_2}))$$

The resulting angle of difference between the uplink PSRS of the UE would then be used, along with the angle of difference for the downlink channel estimate to the phase correction between the downlink and uplink channels as the difference between the uplink angle of difference and the downlink angle of difference. Each of the channel estimates are determined by accumulating the phase difference angles across all of the tones, K.

The channel estimation may be performed either over a wideband incorporating the whole spectrum of the transmission, or may be performed on a per-subband basis, in which the whole spectrum is divided into multiple subbands. The determination of whether to perform wideband or per-subband channel estimation will depend on the timing drift, which corresponds to the second two exponential functions identified in equations (1) and (2).

For wideband feedback, if timing drift is negligible, e.g., $\xi_{BT,i}=0$ and $\xi_{BR,i}=0$, then $$y_{i_1j}^{t,r}(k)(y_{i_2j}^{t,r}(k))^* = H_{DL,i_1j}^{t,r}(k)(H_{DL,i_2j}^{t,r}(k))^*\exp(-J(\varphi_{BT,i_1}-\varphi_{BT,i_2})) \quad (5)$$

$$Z_{ji_1}^{r,t}(k)(Z_{ji_2}^{r,t}(k))^* = H_{UL,ji_1}^{r,t}(k)(H_{UL,ji_2}^{r,t}(k))^*\exp(J(\varphi_{BR,i_1}-\varphi_{BR,i_2})) \quad (6)$$

The UE would then feedback the angle according to the equations:

$$\text{angle}(\Sigma_k(y_{i_1j}^{t,r}(k)(y_{i_2j}^{t,r}(k))^*))=\text{angle}(\exp(-J(\varphi_{BT,i_1}-\varphi_{BT,i_2}))\Sigma_k(H_{DL,i_1j}^{t,r}(k)(H_{DL,i_2j}^{t,r}(k))^*)) \quad (7)$$

While, the gNB would calculate the angle according to the equations:

$$\text{angle}(\Sigma_k(z_{ji_1}^{r,t}(k)(z_{ji_2}^{r,t}(k))^*))=\text{angle}(\exp(-J(\varphi_{BR,i_1}-\varphi_{BR,i_2}))\Sigma_k(H_{UL,ji_1}^{r,t}(k)(H_{UL,ji_2}^{r,t}(k))^*)) \quad (8)$$

The phase difference between gNBs $i_1$ and $i_2$ would correspond to the angle computed according to:

$$\text{angle}(\Sigma_k(y_{i_1j}^{t,r}(k)(y_{i_2j}^{t,r}(k))^*))-\text{angle}(\Sigma_k(z_{ji_1}^{r,t}(k)(z_{ji_2}^{r,t}(k))^*)) \quad (9)$$

When the timing drift is not negligible, then subband feedback, would be calculated according to the equations:

$$y_{i_1j}^{t,r}(k)(y_{i_2j}^{t,r}(k))^* = H_{DL,i_1j}^{t,r}(k)\left(H_{DL,i_2j}^{t,r}(k)\right)^* \quad (10)$$
$$\exp\left(-\frac{J2\pi k(\xi_{BT,i_2} - \xi_{BT,i_2})}{N}\right)\exp(-J(\varphi_{BT,i_1} - \varphi_{BT,i_2}))$$

and $$z_{ji_1}^{r,t}(k)(z_{ji_2}^{r,t}(k))^* = H_{UL,ji_1}^{r,t}(k)\left(H_{UL,ji_2}^{r,t}(k)\right)^* \quad (11)$$
$$\exp\left(\frac{J2\pi k(\xi_{Br,i_1} - \xi_{BR,i_2})}{N}\right)\exp(J(\varphi_{BR,i_1} - \varphi_{BR,i_2}))$$

For the UE feedback, the whole spectrum band would be divided into several subbands. The angle for each of the subbands would computed according to the following equation:

$$\text{angle}(\Sigma_{k_n}(y_{i_1 j}^{r,t}(k))(y_{i_2 j}^{r,t}(k))^*)) \quad (12)$$

After which the UE would feed back the determined angle across the multiple subbands.

On the base station side, the gNB calculates the angle for each of the subband according to the equation:

$$\text{angel}(\Sigma_{k_n}(z_{j i_1}^{r,t}(k))(z_{j i_2}^{r,t}(k))^*)) \quad (13)$$

The phase difference between gNBs $i_1$ and $i_2$ in each of the subband is represented by the equations:

$$\text{angel}(\Sigma_{k_n}(y_{i_1 j}^{r,t}(k))(y_{i_2 j}^{r,t}(k))^*))-\text{angel}(\Sigma_{k_n}(z_{j i_1}^{r,t}(k))(z_{j i_2}^{r,t}(k))^*)) \quad (14)$$

The base station would then compute the timing drift and phase difference with results from all the subbands.

It should be noted that the negligibility of the timing drift will be known by the network in advance. After the system has been set up, the network will know whether the timing drift will be negligible, based on the hardware components of the various network nodes. The network may then be able to configured the UEs within the coverage area whether to process the channel estimations using the wideband or per subband operations.

Figure 6:
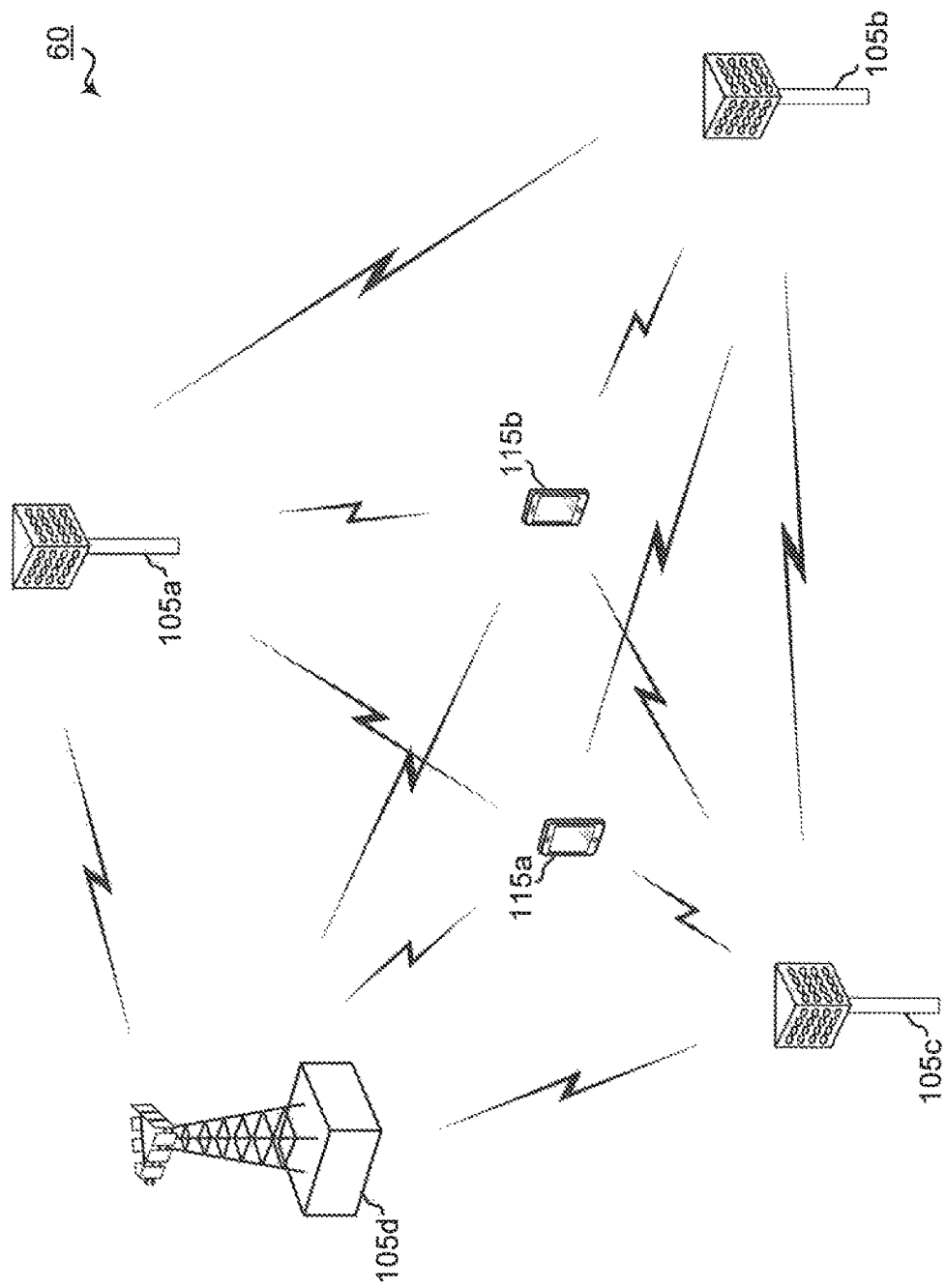
FIG. 6 is a block diagram illustrating an example CoMP operation network configured according to one aspect of the present disclosure.

FIG. 6 is a block diagram illustrating an example CoMP operation network 60 configured according to one aspect of the present disclosure. Base stations 105a-d operate in a CoMP group serving various users, such as UEs 115a-b. In operation of the described aspect, base stations 105a-d each send a downlink PSRS (e.g., configured as a CSI-RS) and each of the served UEs, UEs 115a-b, sends an uplink PSRS (e.g., configured as an SRS). There is no requirement that one or the other of the downlink or uplink PSRS are sent first. At the UEs, each of the UEs, such as, for example, UE 115a receives each of the CSI-RS and, computes a co-phasing value between each pair of the base stations in the CoMP group. For example, UE 115a computes an angle difference between the CSI-RS received from base stations 105a-105b, between the CSI-RS received from base stations 105b-105c, and so on until there is an angle representing the co-phasing value for each pair of base stations in the CoMP group. UE 115a would then report the co-phasing value determined on the downlink CSI-RS transmitted from each of the base stations in the CoMP group.

On the base station side, the base stations, such as base station 105a, receives the SRS from UEs 115a-b. Base station 105a would compute the co-phasing value between the SRS received from UEs 115a at both base station 105a and base station 105b, for example. Base station 105a would compute the co-phasing value as a phase difference between the SRS from UE 115a as received by both base stations of the paired group (e.g., 105a-105b, 105a-105c, 105a-105d, etc.). Once base station 105a receives the reported downlink co-phasing value from UEs 115a-b, it may then determine the phase compensation value by computing the difference between the reported downlink co-phasing value and the computed uplink co-phasing value for each UE. Base station 105a would then use the phase compensation value to adjust the communications of the base stations in the CoMP group.

In a first optional example, when CoMP operation network 60 is set up, the timing drift is negligible, thus, the channel estimates and co-phasing values are determined by base stations 105a-d and UEs 115a-b using the wideband operation. However, in a second operation example, CoMP operation network 60 determines on set-up that the timing drift is not negligible. Thus, the channel estimate and co-phasing values are determined by base stations 105a-d and UEs 115a-b on a per-subband basis. In either optional example, the network would signal the UE upon access that the phase synchronization of the described aspect will be performed using either the wideband or per-subband procedures.

In a further additional aspect of the present disclosure, the co-phasing terms may not be explicitly signaled to the other network entity, but, instead, implicitly signaled to the other entity by using the co-phasing value to modulate the PSRS transmitted to the other entity.

Figure 7:
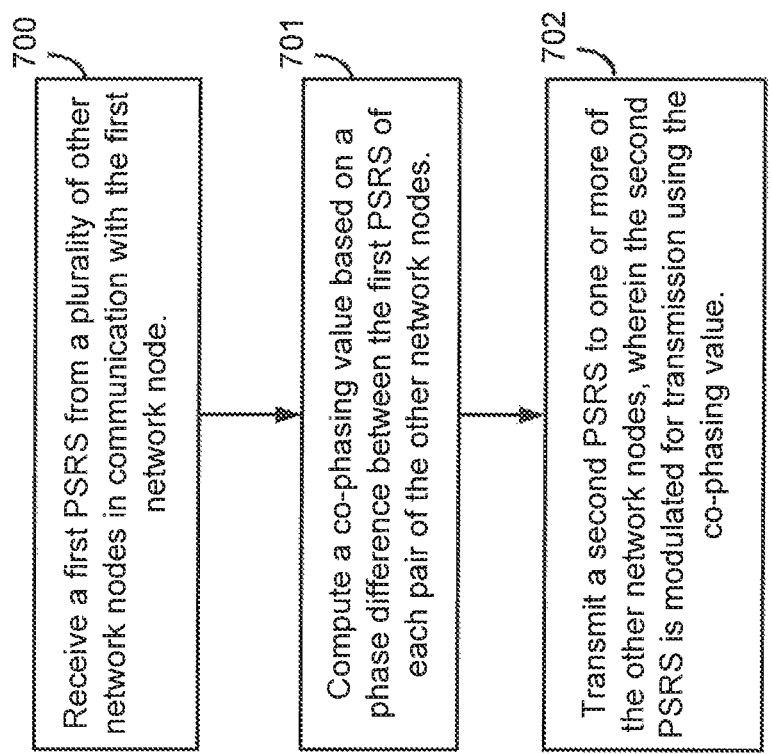
FIG. 7 is a block diagram illustrating example blocks executed to implement one aspect of the present disclosure.

FIG. 7 is a block diagram illustrating example blocks executed to implement one aspect of the present disclosure. The blocks of FIG. 7 may also be described with respect to the features of gNB 105 and UE 115, as illustrated in FIGS. 8 and 9. At block 700, a first network node receives a first PSRS from a plurality of the other network nodes in communication with the first network node. This may occur as a base station, gNB 105, that operates as a part of multiple base stations in a CoMP group receives uplink PSRS via antennas 234a-t and wireless radios 800a-t from multiple UEs being served. Alternatively, this may occur as a UE, UE 115, that receives downlink PSRS, via antennas 252a-r and wireless radios 900a-r, from multiple base stations operating in a CoMP group that serves UE 115.

At block 701, the first network node computes a co-phasing value based on a phase difference between the first PSRS of each pair of the other network nodes. When the first network node is the base station, such as gNB 105, gNB 104 would compute the co-phasing value through execution of phase measurement 802, by determining the phase difference between the uplink PSRS received from the UEs, when grouped in pairs. Alternatively, when the first network node is the UE, such as UE 115, UE 115 would compute the co-phasing value, through execution of phase measurement 901, by determining the phase difference between the downlink PSRS received from each of the base stations in the CoMP group, grouped in pairs.

At block 702, the first network node transmits a second PSRS to one or more of the other network nodes, wherein the second PSRS is modulated for transmission using the co-phasing value. Thus, in the base station alternative, gNB 105 would transmit its downlink PSRS to the one or more UEs being served using wireless radios 800a-t and antennas 234a-t, where the downlink PSRS would be modulated by wireless radios 800a-t using the uplink co-phasing value determined by the base station based on the uplink PSRS. Similarly, in the UE alternative, UE 115 would transmit its uplink PSRS to the one or more base stations in the CoMP group using wireless radios 900a-r and antennas 252a-r, where the uplink PSRS would be modulated by wireless radios 900a-r using the downlink co-phasing value determined by the UE based on the downlink PSRS.

The receiving entity of the PSRS modulated with the co-phasing value would be able to determine the phase compensation by computing the phase difference on the PSRS received and the co-phasing value implicitly communicated with the modulation. If the receiving entity is the base station, such as gNB 105, it may then use the phase compensation information to adjust communications of the CoMP group using wireless radios 800a-t. If the receiving entity is the UE, such as UE 115, it may then report the phase compensation information back to one or more of the base stations in the CoMP group using wireless radios 900a-r and antennas 252a-r, such as via a PUCCH or PUSCH.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The functional blocks and modules in FIGS. 5A, 5B, and 7 may comprise processors, electronics devices, hardware devices, electronics components, logical circuits, memories, software codes, firmware codes, etc., or any combination thereof.

Those of skill would further appreciate that the various illustrative logical blocks, modules, circuits, and algorithm steps described in connection with the disclosure herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure. Skilled artisans will also readily recognize that the order or combination of components, methods, or interactions that are described herein are merely examples and that the components, methods, or interactions of the various aspects of the present disclosure may be combined or performed in ways other than those illustrated and described herein.

The various illustrative logical blocks, modules, and circuits described in connection with the disclosure herein may be implemented or performed with a general-purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the disclosure herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

In one or more exemplary designs, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. Computer-readable storage media may be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, a connection may be properly termed a computer-readable medium. For example, if the software is transmitted from a website, server, or other remote source using a coaxial cable, fiber optic cable, twisted pair, or digital subscriber line (DSL), then the coaxial cable, fiber optic cable, twisted pair, or DSL, are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

As used herein, including in the claims, the term "and/or," when used in a list of two or more items, means that any one of the listed items can be employed by itself, or any combination of two or more of the listed items can be employed. For example, if a composition is described as containing components A, B, and/or C, the composition can contain A alone; B alone; C alone; A and B in combination; A and C in combination; B and C in combination; or A, B, and C in combination. Also, as used herein, including in the claims, "or" as used in a list of items prefaced by "at least one of" indicates a disjunctive list such that, for example, a list of "at least one of A, B, or C" means A or B or C or AB or AC or BC or ABC (i.e., A and B and C) or any of these in any combination thereof.

The previous description of the disclosure is provided to enable any person skilled in the art to make or use the disclosure. Various modifications to the disclosure will be readily apparent to those skilled in the art, and the generic principles defined herein may be applied to other variations without departing from the spirit or scope of the disclosure. Thus, the disclosure is not intended to be limited to the examples and designs described herein but is to be accorded the widest scope consistent with the principles and novel features disclosed herein.

What is claimed is:

1. A method of wireless communication, comprising:
receiving, at a base station, a downlink co-phasing value from one or more served user equipments (UEs), wherein the downlink co-phasing value received from each UE of the one or more served UEs comprises a downlink phase difference value computed by the UE based on a first phase difference between downlink phase synchronization reference signals (PSRS) received at the UE of the one or more served UEs from a pair of base stations, and wherein the base station receiving the downlink co-phasing value from the one or more served UEs is one of a plurality of base stations in a coordinated multipoint (CoMP) group serving the one or more served UEs;
receiving, at the base station, an uplink PSRS from the one or more served UEs;
computing, by the base station, an uplink co-phasing value comprising an uplink phase difference value, wherein the uplink phase difference value is determined based on a second phase difference between the uplink PSRS as received by a pair of base stations of the plurality of base stations; and applying, by the base station, a phase correction value to communications by the plurality of base stations in the CoMP group, wherein the phase correction value is determined from a difference between the downlink phase difference value of the downlink co-phasing value and the uplink phase difference value of the uplink co-phasing value.

2. The method of claim 1, wherein the computing includes:

determining, by the base station, a first angle of the second phase difference between the uplink PSRS as received by the pair of base stations of the plurality of base stations, wherein the downlink co-phasing value corresponds to a second angle identifying the first phase difference.

3. The method of claim 1, further including:

determining, by the base station, a symbol timing drift between each of the plurality of base stations in the CoMP group;

determining, by the base station, to perform the computing on a per-subband basis when the symbol timing drift is below a threshold value, wherein the method further includes:

signaling, by the base station, a configuration instruction to the one or more served UEs to calculate the downlink co-phasing value on the per-subband basis; and determining, by the base station, to perform the computing on a wideband basis when the symbol timing drift is above the threshold value, wherein the method further includes:

signaling, by the base station, the configuration instruction to the one or more served UEs to calculate the downlink co-phasing value on the wideband basis.

4. The method of claim 3, wherein the computing is performed on a wideband basis and includes:

computing the uplink co-phasing value over a whole spectrum band, wherein the uplink co-phasing value corresponds to the second phase difference accumulated over each of a plurality of tones of the whole spectrum band.

5. The method of claim 3, wherein the computing is performed on a per-subband basis, the method further including:

dividing, by the base station, a whole spectrum band, into a plurality of subbands, wherein the computing includes:

computing the uplink co-phasing value over each of a plurality of tones within each of the plurality of subbands, wherein the uplink co-phasing value includes a value for each of the plurality of subbands and wherein the downlink co-phasing value includes an entry for each of the plurality of subbands.

6. The method of claim 1, wherein the downlink PSRS corresponds to a channel state information (CSI) reference signal (CSI-RS) and the uplink PSRS corresponds to a sounding reference signal (SRS).

7. A method of wireless communication, comprising:

transmitting, by a user equipment (UE), an uplink phase synchronization reference signal (PSRS) to one or more base stations, wherein the one or more base stations to which the PSRS is transmitted are part of a plurality of base stations in a coordinated multipoint (CoMP) group serving the UE;

receiving, at the UE, a configuration instruction to either determine a downlink co-phasing value on a per-subband basis or to determine the downlink co-phasing value on a wideband basis, wherein the configuration instruction is based upon symbol timing drift between transmission points of base stations of the plurality of base stations to which the PSRS is transmitted;

receiving, at the UE, a downlink PSRS from each of the plurality of base stations in the CoMP group;

determining, by the UE in accordance with the configuration instruction that is based upon symbol timing drift between transmission points of base stations of the plurality of base stations to which the PSRS is transmitted, the downlink co-phasing value between each base station pair of the plurality of base stations representing a phase difference between the downlink PSRS from each of the base station pairs; and reporting, by the UE to a base station of the plurality of base stations, the downlink co-phasing value for each of the base station pairs.

8. The method of claim 7, wherein the determining includes:

computing, by the UE, a first angle of the phase difference between the downlink PSRS from each of the base station pairs.

9. The method of claim 7, wherein the determining the downlink co-phasing value is performed on a wideband basis and includes:

determining the downlink co-phasing value over a whole spectrum band, wherein the downlink co-phasing value corresponds to the phase difference accumulated over each of a plurality of tones of the whole spectrum band.

10. The method of claim 7, wherein the determining the downlink co-phasing value is performed on a per-subband basis, the method further including:

dividing, by the UE, a whole spectrum band, into a plurality of subbands, wherein the determining the downlink co-phasing value includes:

determining the downlink co-phasing value over each of a plurality of tones within each of the plurality of subbands, wherein the downlink co-phasing value includes a value for each of the plurality of subbands.

11. The method of claim 7, wherein the downlink PSRS corresponds to a channel state information (CSI) reference signal (CSI-RS) and the uplink PSRS corresponds to a sounding reference signal (SRS).

12. A method of wireless communications, comprising:

receiving, at a first network node, a first phase synchronization reference signal (PSRS) from a plurality of other network nodes in communication with the first network node receiving the first PSRS;

computing, by the first network node, a co-phasing value, wherein a computation for the co-phasing value is determined based on a phase difference between the first PSRS of each other network node pair of the plurality of other network nodes, wherein the computation for the co-phasing value includes:

computing the co-phasing value over a plurality of tones accumulated over a whole spectrum band when a symbol timing drift between each of a plurality of base stations in a coordinated multipoint (CoMP) group being below a threshold value; or computing the co-phasing value over each of a plurality of tones within each of a plurality of subbands of a whole spectrum band when the symbol timing drift between each of the plurality of base stations above the threshold value; and transmitting, by the first network node, a second PSRS to one or more network nodes of the plurality of other network nodes, wherein the second PSRS is modulated for transmission by the first network node using the co-phasing value computed by the first network node.

13. The method of claim 12,
wherein the first network node corresponds to a user equipment (UE) and the plurality of other network nodes corresponds to a plurality of base stations in a coordinated multipoint (CoMP) group serving the UE,
wherein the first PSRS corresponds to a channel state information (CSI) reference signal (CSI-RS), and
wherein the second PSRS corresponds to a sounding reference signal (SRS).

14. The method of claim 12,
wherein the first network node corresponds to a base station of a plurality of base stations in a coordinated multipoint (CoMP) group and the plurality of other network nodes correspond to a plurality of user equipments (UEs), wherein at least one of the plurality of UEs is served by the first network node,
wherein the first PSRS corresponds to a sounding reference signal (SRS), and
wherein the second PSRS corresponds to a channel state information (CSI) reference signal (CSI-RS).

15. The method of claim 14, further including:
applying, by the base station, a phase correction value to communications by the plurality of base stations in the CoMP group, wherein the phase correction value corresponds to a difference between the first PSRS and the second PSRS.

16. An apparatus configured for wireless communication, the apparatus comprising:
at least one processor; and
a memory coupled to the at least one processor,
wherein the at least one processor is configured:
to receive, at a base station, a downlink co-phasing value from one or more served user equipments (UEs), wherein the downlink co-phasing value received from each UE of the one or more served UEs comprises a downlink phase difference value computed by the UE based on a first phase difference between downlink phase synchronization reference signals (PSRS) received at the UE of the one or more served UEs from a pair of base stations, and wherein the base station receiving the downlink co-phasing value from the one or more served UEs is one of a plurality of base stations in a coordinated multipoint (CoMP) group serving the one or more served UEs;
to receive, at the base station, an uplink PSRS from the one or more served UEs;
to compute, by the base station, an uplink co-phasing value comprising an uplink phase difference value, wherein the uplink phase difference value is determined based on a second phase difference between the uplink PSRS as received by a pair of base stations of the plurality of base stations; and to apply, by the base station, a phase correction value to communications by the plurality of base stations in the CoMP group, wherein the phase correction value is determined from a difference between the downlink phase difference value of the downlink co-phasing value and the uplink phase difference value of the uplink co-phasing value.

17. The apparatus of claim 16, wherein the configuration of the at least one processor to compute includes configuration to determine, by the base station, a first angle of the second phase difference between the uplink PSRS as received by the pair of base stations of the plurality of base stations, wherein the downlink co-phasing value corresponds to a second angle identifying the first phase difference.

18. The apparatus of claim 16, further including configuration of the at least one processor:
to determine, by the base station, a symbol timing drift between each of the plurality of base stations in the CoMP group;
to determine, by the base station, to compute the uplink co-phasing value on a per-subband basis when the symbol timing drift is below a threshold value, wherein the apparatus further includes configuration of the at least one processor to signal, by the base station, a configuration instruction to the one or more served UEs to calculate the downlink co-phasing value on the per-subband basis; and
to determine, by the base station, to compute the uplink co-phasing value on a wideband basis when the symbol timing drift is above the threshold value, wherein the apparatus further includes configuration of the at least one processor to signal, by the base station, the configuration instruction to the one or more served UEs to calculate the downlink co-phasing value on the wideband basis.

19. The apparatus of claim 18,
wherein the configuration of the at least one processor to compute is executed on a wideband basis and includes configuration to compute the uplink co-phasing value over a whole spectrum band, wherein the uplink co-phasing value corresponds to the second phase difference accumulated over each of a plurality of tones of the whole spectrum band.

20. The apparatus of claim 18,
wherein the configuration of the at least one processor to compute is executed on a per-subband basis, the apparatus further including configuration of the at least one processor:
to divide, by the base station, a whole spectrum band, into a plurality of subbands, wherein the configuration of the at least one processor to compute includes configuration to compute the uplink co-phasing value over each of a plurality of tones within each of the plurality of subbands, wherein the uplink co-phasing value includes a value for each of the plurality of subbands and wherein the downlink co-phasing value includes an entry for each of the plurality of subbands.

21. The apparatus of claim 16, wherein the downlink PSRS corresponds to a channel state information (CSI) reference signal (CSI-RS) and the uplink PSRS corresponds to a sounding reference signal (SRS).

* * * * *